United States Patent
Chien et al.

(10) Patent No.: US 7,394,870 B2
(45) Date of Patent: Jul. 1, 2008

(54) LOW COMPLEXITY SYNCHRONIZATION FOR WIRELESS TRANSMISSION

(75) Inventors: Charles Chien, Newbury Park, CA (US); David Hsueh-Chia Chien, S. El Monte, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 672 days.

(21) Appl. No.: 10/407,572

(22) Filed: Apr. 4, 2003

(65) Prior Publication Data
US 2004/0196926 A1    Oct. 7, 2004

(51) Int. Cl.
*H04L 27/00* (2006.01)
(52) U.S. Cl. .............. 375/316; 375/345; 375/354; 375/326; 375/150
(58) Field of Classification Search .......... 375/316, 375/355, 363, 368, 345, 354, 326, 150; 370/511
See application file for complete search history.

(56) References Cited

U.S. PATENT DOCUMENTS

| | | | | | |
|---|---|---|---|---|---|
| 4,647,864 | A | * | 3/1987 | Rafferty et al. | 329/302 |
| 5,561,673 | A | * | 10/1996 | Takai et al. | 714/708 |
| 5,651,031 | A | * | 7/1997 | Ishizu | 375/328 |
| 5,757,858 | A | * | 5/1998 | Black et al. | 375/295 |
| 6,134,282 | A | * | 10/2000 | Ben-Efraim et al. | 375/350 |
| 6,208,183 | B1 | * | 3/2001 | Li et al. | 327/161 |
| 6,385,259 | B1 | * | 5/2002 | Sung et al. | 327/161 |
| 6,430,172 | B1 | * | 8/2002 | Usui et al. | 370/347 |
| 6,646,980 | B1 | * | 11/2003 | Yamamoto et al. | 370/208 |
| 6,668,023 | B1 | * | 12/2003 | Betts | 375/285 |
| 6,843,597 | B1 | * | 1/2005 | Li et al. | 375/345 |
| 2002/0135482 | A1 | * | 9/2002 | Frederick | 340/572.1 |
| 2003/0128746 | A1 | * | 7/2003 | Lerner et al. | 375/148 |
| 2003/0202389 | A1 | * | 10/2003 | Werner et al. | 365/200 |
| 2004/0072552 | A1 | * | 4/2004 | Park et al. | 455/334 |

OTHER PUBLICATIONS

Charles Chien, Igor Elgorriaga, Charles McConaghy, *Low-Power Direct-Sequence Spread-Spectrum Modem Architecture For Distributed Wireless Sensor Networks*, Association for Computing Machinery, ISLPED '01, Aug. 6-7, 2001, Huntington Beach, California, USA, pp. 251-254.

* cited by examiner

*Primary Examiner*—Mohammed Ghayour
(74) *Attorney, Agent, or Firm*—DLA Piper US LLP

(57) ABSTRACT

A receiver, system and method for providing symbol timing recovery that allows for inexpensive and low-complexity synchronization for communication systems. A receiver receives a signal including digital data in the form of packets that is transmitted from a transmitter. The receiver uses information contained in each of the packets to align a phase of the receiver clock with a phase of the transmitter clock. The receiver further controls a sampling device such that the in-phase (I) and quadrature (Q) components are sampled at an optimum sample rate and at an optimum instance of time without requiring a numerically controlled oscillator or voltage controlled oscillator.

95 Claims, 23 Drawing Sheets

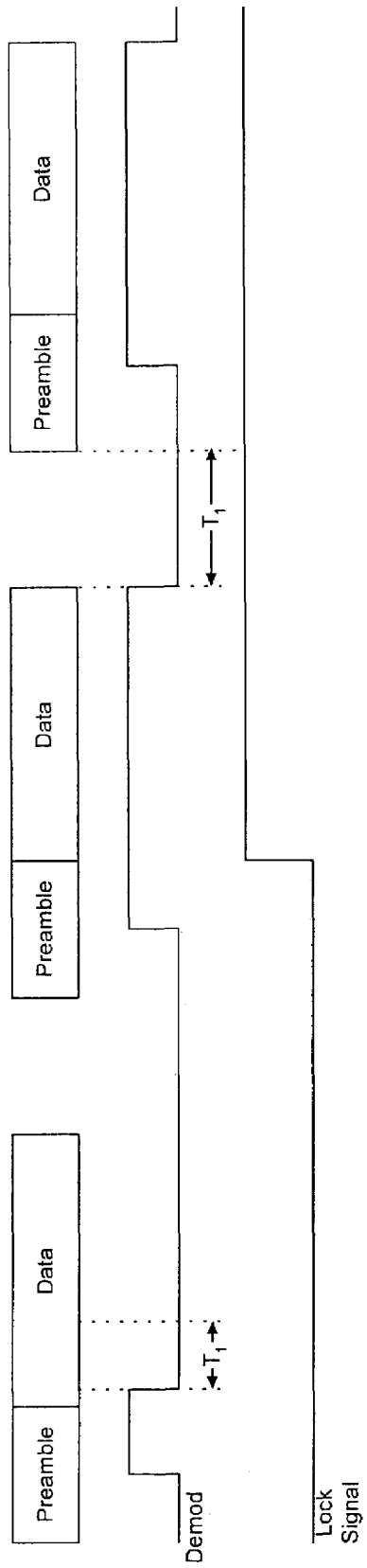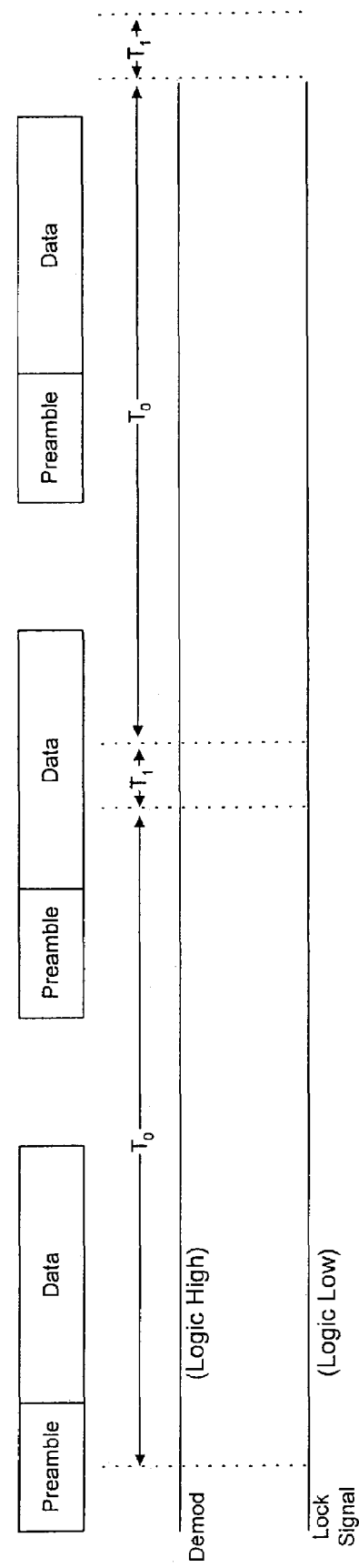

LOW COMPLEXITY SYNCHRONIZATION FOR WIRELESS TRANSMISSION

BACKGROUND OF THE INVENTION

1. Field of the Invention

The present invention relates generally to the field of digital communications. Specifically, the present invention relates to synchronizing digital receivers to symbol timing. More specifically, the present invention relates to recovering symbol timing in a received signal by controlling a sampling device such that in-phase (I) and quadrature (Q) components of the received signal are sampled at a symbol rate.

2. Description of the Related Art

The efficient functioning of modern data communications systems using bidirectional digital data communication requires clock and data recovery circuitry. The ability to regenerate binary data is an inherent advantage of transmitting information digitally as opposed to transmitting such information in analog form. However, in order for the intelligence signal to be correctly reconstructed at the receiving end, the transmitted binary data must be regenerated with the fewest possible number of bit errors, requiring received data to be sampled at an optimum sample rate and at an optimum instance of time. Due to limited bandwidth, it is generally impractical to transmit the required sampling clock signal separate from the transmitted data signal. As a result, modern digital communication systems derive timing information from the incoming transmitted data signal itself. Extraction of the implicit timing signal is generally termed timing recovery (or clock recovery).

Modern digital communication receivers perform timing recovery using symbol synchronization. Symbol synchronization in a digital communication receiver refers to identifying the-instants in time at which samples of an input communication signal are best obtained to recover data conveyed by the input communication signal. Only one sample is needed per symbol interval to accurately recover communicated data. A symbol interval, also called a unit interval or simply a symbol, is a discrete duration within which a received signal conveys a unit of data. The unit of data may include one or more bits. The process of symbol synchronization determines the best instant within each symbol interval at which to obtain a sample that will be relied upon in the recovery of the unit of data.

A block diagram of a conventional symbol timing recovery system for providing symbol synchronization is shown in FIG. 1. Phase detector 102 provides an error signal to an input of loop filter 104, the output of which provides an input to timing oscillator 106 which produces the recovered clock as an output. This information is essentially a sampling clock for controlling the symbol sampling operation of sampling device 108.

In conventional symbol timing recovery systems, timing oscillator 106 can be either a voltage controlled oscillator or a numerically controlled oscillator (NCO). The recovered clock is applied to a control input of sampling device 108, which captures symbol data at "windows" of the received signal pattern. Sampling device 108 may comprise an analog-to-digital converter (ADC).

The use of these conventional timing oscillators in symbol timing recovery systems requires the use of expensive high speed components and/or the use of excessively complex circuits. For example, if an NCO is used as the timing oscillator, it is a requirement that the NCO be operated at a high frequency in order to provide enough resolution to provide for optimum sampling. Thus, typically the NCO must be clocked at a frequency that is, for example, 16 to 32 times the symbol rate.

In order to provide a high speed clock for the NCO, a high frequency crystal oscillator may be provided. However, such a high frequency crystal oscillator is expensive. Thus, although the NCO provides excellent resolution to provide for optimum sampling, it adds greatly to the cost of the symbol timing recovery system.

As an alternative to providing the high frequency crystal oscillator to clock the NCO, a phase locked loop (PLL) may be provided in combination with a less expensive crystal oscillator having a frequency closer to the symbol rate. The PLL multiplies the crystal oscillator frequency to be 16 to 32 times the symbol rate at its output. The output of the PLL is then provided to the NCO. However, the PLL/crystal oscillator combination requires additional circuitry and thus adds to the complexity of the symbol timing recovery system.

Another conventional timing oscillator used in symbol timing recovery systems is a voltage controlled oscillator (VCO). The digital data may be converted by a digital to analog converter (DAC) to an analog signal. The analog signal is then input to the VCO. The output of the VCO then provides the appropriate frequency and phase to the sampling device 108. Although, using of a VCO for the timing oscillator avoids any requirement of for a high speed crystal oscillator, it still requires additional circuitry and thus adds to the complexity of the symbol timing recovery system.

Thus, there remains a need for an inexpensive and low-complexity symbol timing recovery system.

SUMMARY OF THE DISCLOSURE

Embodiments of the present invention provide for symbol timing recovery that allows for inexpensive and low-complexity synchronization for communication systems by eliminating the need for a numerically controlled oscillator or voltage controlled oscillator. Embodiments of the present invention relate to a receiver, system and method for recovering symbol timing in a received signal by controlling a sampling device such that in-phase (I) and quadrature (Q) components of the received signal are sampled at a symbol rate.

According to a first embodiment of the present invention, a receiver is provided for receiving a signal including digital data in the form of packets transmitted from a transmitter. The receiver uses information contained in each of the packets to align a phase of the receiver clock with a phase of the transmitter clock and controls a sampling device such that the in-phase (I) and quadrature (Q) components are sampled at a symbol rate.

The receiver comprises a radio frequency (RF) receiver section for receiving the transmitted digital data as in-phase (I) and quadrature (Q) components of a baseband signal. The sampling device digitizes each of the in-phase (I) and quadrature (Q) components. A clock recovery section of the receiver correlates the in-phase (I) and quadrature (Q) components with information contained in each of the packets. The clock recovery section generates an adjust signal to align the phase of the receiver clock with the phase of the transmitter clock based on the correlation of the in-phase (I) and quadrature (Q) components with the information contained in each of the packets.

After the phase of the receiver clock is aligned with the phase of the transmitter clock, the clock recovery section generates a demodulation signal. The demodulation signal controls the sampling device such that the in-phase (I) and quadrature (Q) components are sampled at a symbol rate.

According to embodiments of the present invention, the sampling device comprises a pair of analog-to-digital converters (ADC), each for sampling one of the in-phase (I) and quadrature (Q) components. The pair of analog-to-digital converters are adapted to be clocked by an output of a multiplexer (MUX). The demodulation signal controls the ADCs by controlling a select line of the MUX to select the symbol clock to be provided at the output of the MUX such that the analog-to-digital converters (ADC) sample the in-phase (I) and quadrature (Q) components at the symbol rate.

According to embodiments of the present invention, the clock recovery section comprises a correlation section for correlating the in-phase (I) and quadrature (Q) components with information contained in each of the packets by determining correlation peaks of the received signal based on the information contained in each of the packets. The information contained in the packets may comprise a synchronization code. In one embodiment, the synchronization code is contained in the preamble of the packets.

According to embodiments of the present invention, the preamble may comprise a plurality of periods of the synchronization code and the correlation section correlates the in-phase (I) and quadrature (Q) components with at least one period of the synchronization code. A first portion of the synchronization code may not be differentially encoded and a second portion of the synchronization code may be differentially encoded. In one embodiment, the synchronization code is an 11-bit Barker sequence.

According to embodiments of the present invention, the correlation section comprises a pair of matched filters for filtering the in-phase (I) and quadrature (Q) components to generate filtered outputs and a pair of squarers for squaring the filtered outputs to generate squared outputs. The correlation section further comprises an adder for adding the squared outputs to generate a correlation output. In one embodiment, each matched filter comprises a finite impulse response (FIR) filter having coefficients equal to a time reverse of the synchronization code contained in the packets.

According to embodiments of the present invention, the clock recovery section further comprises an enable window section for determining if the correlation output is equal to or greater than a first threshold. The clock recovery section further comprises a peak detector section enabled by the enable window section for searching for a correlation peak of the correlation output when the correlation output is equal to or greater than the first threshold.

According to embodiments of the present invention, each time a correlation peak is detected by the peak detector section a lock clock signal is generated. A duration of a predetermined number of the generated lock clock signals is determined. The duration of the predetermined number of the generated lock clock signals is compared with a predetermined criteria. An adjust signal is generated if the duration of the predetermined number of the generated third signals meets the predetermined criteria. The adjust signal is provided to a timing generator section.

The timing generator section receives as an input an over-sampled clock signal having a first rate greater than the symbol rate. The timing generator section generates a clock signal having a first or second symbol rate in response to the adjust signal. In one embodiment, the over-sampled clock signal may be four times the first symbol rate and eight times the second symbol rate. In one embodiment, the first symbol rate or the second symbol rate is selected based on an over-sampling select line.

These and other features and advantages of embodiments of the invention will be apparent to those skilled in the art from the following detailed description of embodiments of the invention, when read with the drawings and appended claims.

BRIEF DESCRIPTION OF THE DRAWINGS

The present invention is illustrated by way of example, and not by way of limitation, in the figures of the accompanying drawings and in which:

FIG. 21 shows a timing diagram of an amount of time to wait before automatic gain control (AGC) is performed on a succeeding packet when a demodulation signal is making transitions, according to embodiments of the present invention;

FIG. 22 shows a timing diagram of an amount of time to wait before AGC is performed on a succeeding packet when a demodulation signal is not making transitions, according to embodiments of the present invention;

DETAILED DESCRIPTION OF THE PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention relate, generally, to the field of digital communications. Specifically, the present invention relates to synchronizing digital receivers to symbol timing. More specifically, the present invention relates to recovering symbol timing in a received signal by controlling a sampling device such that in-phase (I) and quadrature (Q) components of the received signal are sampled at a symbol rate.

Embodiments of the present invention may be employed in a variety of communications electronics, including wireless transmission systems as well as wired systems. Thus, embodiments of the invention described herein may be employed in various communications systems, including wireless applications, such as, but not limited to wireless Local Area Networks (LANs), wireless personal communication devices including radios, cellular telephones, mobile cordless telephones, Personal Digital Assistants (PDAs), Personal Computer Memory Card International Association (PCMCIA) computer interface applications, telemetry systems, global positioning systems (GPS) and other RF devices. In these applications, it is typically desirable to implement inexpensive and low-complexity symbol timing recovery systems.

As discussed above, conventional symbol timing recovery systems utilize a timing oscillator such as a numerically controlled oscillator (NCO) or a voltage controlled oscillator (VCO). These timing oscillators are required in the conventional symbol timing recovery systems in order to allow received data to be sampled at an optimum sample rate and at an optimum instance of time. Embodiments of the present invention provide a symbol timing recovery system that allows for optimum sampling of the received data without requiring an NCO or VCO. Thus, embodiments of the present invention reduce the complexity and cost of communication systems that require a symbol timing recovery system.

Figure 1:
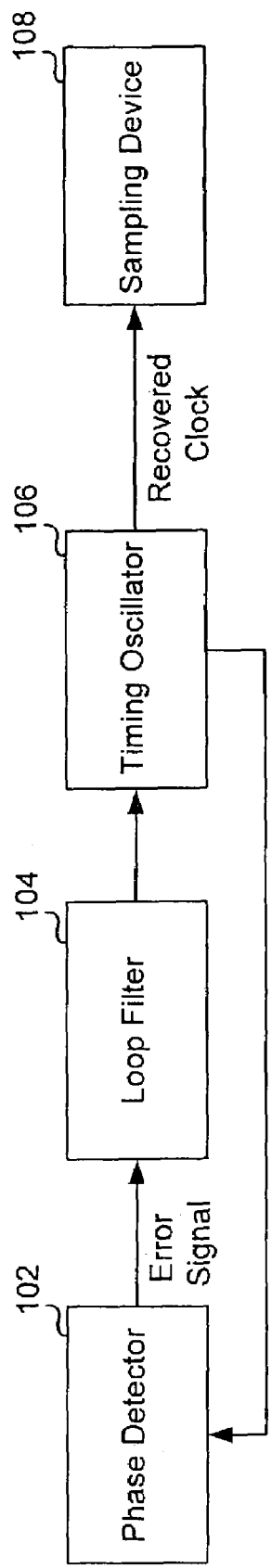
FIG. 1 shows a block diagram of a conventional symbol timing recovery system for providing symbol synchronization.
Figure 2:
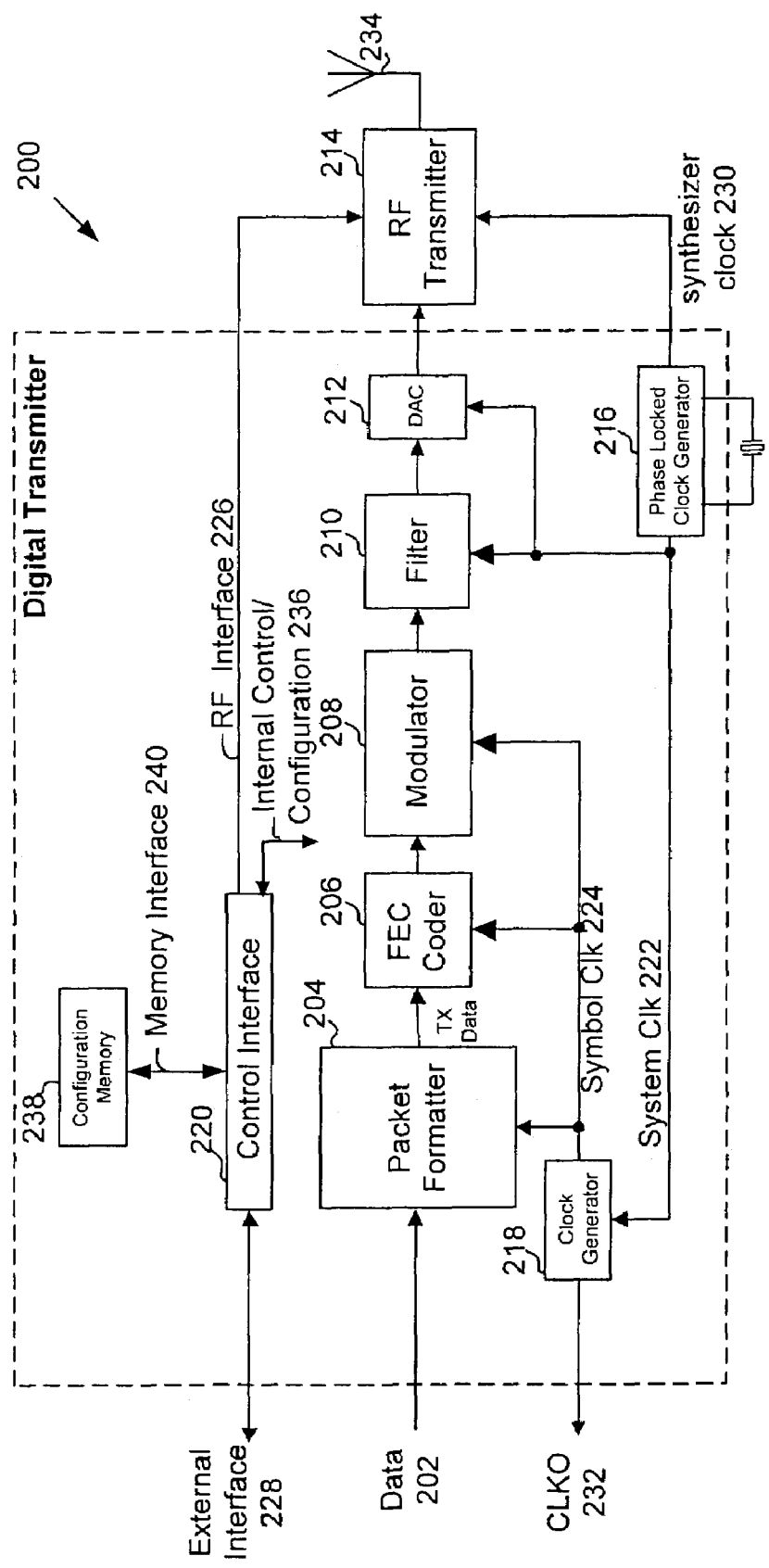
FIG. 2 shows an exemplary transmitter that may be employed with embodiments of the present invention.

Referring to FIG. 2, an exemplary transmitter 200 that may be employed with embodiments of the present invention is shown. Input data 202 is converted by packet formatter section 204 to a predetermined packet format. According to embodiments of the present invention, the input data 202 may be fed serially and may require buffering. Thus, in one embodiment, transmitter 200 may include a serial to parallel converter (not shown). The input data 202 may first be fed into the serial to parallel converter so that data may be buffered into an eight or 16 bit wide register file. Once the data is formatted by the packet formatter section 204, it may be transferred serially to a modulator section 208 at the symbol clock 224 rate. Buffering and formatting may be implemented with methods known in the art.

Figure 3:
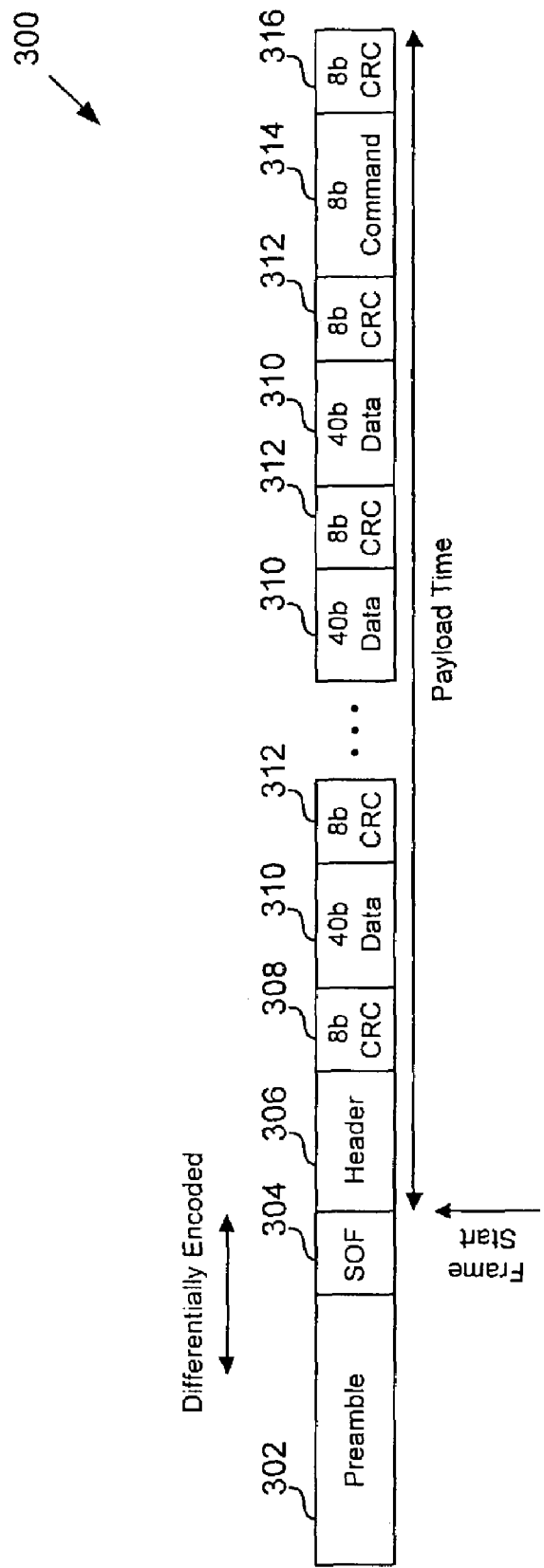
FIG. 3 shows a packet format that may be employed with embodiments of the present invention.

According to embodiments of the present invention, the packet formatter section 204 takes the input and generates packets with the format shown in FIG. 3. Packet 300 comprises a preamble 302, followed by a start-of-frame (SOF) field 304, a header 306 with a cyclic redundancy check (CRC) 308, N data blocks 310 with a CRC 312 computed for each data block, and an optional command field 314 followed by its own CRC 316.

In one preferred embodiment, a typical packet may consist of a three bit SOF field, an eight bit header with an eight bit CRC, and N data blocks, each having an eight bit CRC. The packet may also optionally include an eight bit command field with an eight bit CRC. Each data block may be 40 bits long and the number of blocks N may be specified by the header field, which may consist of a 5 bit "length" field, a command indicator bit, and two reserved bits. An exemplary header field format, according to embodiments of the present invention, is shown in Table 1.

As shown in Table 1, the eight header bits are represented by the notation Header[7:01] (i.e., bits 0-7 of the header), where bit 7 is the most significant bit (MSB) and is transmitted first. Header[7:3] (i.e., bits 3-7 of the header) specify N, the number of data blocks 310 in the packet 300. A value of '00000' indicates that there are no data blocks and values '00001' to '11111' indicate that the number of data blocks are from 1 to 31. Thus, only one of the values '00001' to '11111' would be specified in the header for each packet to indicate the number of data blocks contained in the packet. Each data block 310 is defined as 40 bits plus an eight bit CRC.

Header[2] (i.e., bit 2 of the header) indicates whether the packet contains an eight bit command field followed by an eight bit CRC. A value of '0' indicates that there is no command field and a value of '1' indicates that there is a command field. Header[1:0] (i.e., bits 0-1 of the header) may be bits reserved for later use.

TABLE 1

(Header Format)

| Bit Allocation | Function | Valid Values | Parameter |
|---|---|---|---|
| Header[7:3] | Length field | 00000 | No data block |
| | | 00001-11111 | 1 to 31 data blocks |
| Header[2] | Command indicator | 0 | No command byte |
| | | 1 | Contains command byte |
| Header[1:0] | Reserved | NA | NA |

According to embodiments of the present invention, the preamble 302 of packet 300 may consist of M periods of a synchronization code. In preferred embodiments, the synchronization code may comprise the 11-bit Barker sequence or period, $\{-1, -1, -1, +1, +1, +1, -1, +1, +1, -1, +1\}$, known in the art. In other words, the 11-bit Barker sequence may be repeated M times to form the preamble 302. In other embodiments, other suitable synchronization codes may be used such as, but not limited to, pseudo noise (PN) codes (such as maximal length sequence (M sequence)), a Kasami sequence and a Gold sequence.

Moreover, according to embodiments of the present invention, the latter portion of the preamble 302, as well as all of SOF field 304, may be modulated using differentially encoded phase shift keying (PSK) while the data blocks 310 and associated CRCs 312 of packet 300, as well as header 306 and its associated CRC 308, may be modulated using a different modulation scheme. If the modulation scheme is different for the data blocks 310 and header 306, the modulator 208 (FIG. 2) may change the modulation scheme after the SOF field 304 has been sent. In a preferred embodiment, a typical preamble length is 15 periods of the Barker sequence with 11 of the periods not differentially encoded. In other words, the first 11 periods of the Barker sequence are not differentially encoded, while the last four periods are differentially encoded.

Referring again to FIG. 2, according to embodiments of the present invention, packet 300 is sent serially to the forward error correction (FEC) coder 206. FEC coder 206 encodes the transmit (TX) data to provide robustness against noise and interference.

The encoded data output from FEC coder 206 is then sent to modulator 208, which maps its input to a discrete analog waveform based on modulation methods known in the art, such as, but not limited to, binary phase shift key (BPSK) or quaternary phase shift keying (QPSK). The modulated signal is then sent to a filter 210 that rejects images generated by the sampling process and reduces sidebands generated outside the main signal bandwidth. The filter 210 is clocked by the system clock 222, which is typically four to eight times the frequency of the symbol clock 224. The filter 210 should interpolate the incoming slower samples to samples at a rate equal to an over-sampled clock rate. Filter 210 may be constructed based on methods known in the art.

The output of filter 210 is then sent to the RF transmitter 214, after conversion to an analog signal through the digital-to-analog converter (DAC) 212. The RF transmitter 214 may be implemented with a variety of different architectures, such as, but not limited to, direct-conversion, low-intermediate frequency (low-IF), or super-heterodyne. RF transmitter 214 includes antenna 234 for transmitting the RF signal.

A phase-locked clock generator 216 generates the system clock 222 and the synthesizer clock 230. The system clock 222 is the over-sampled clock and, as stated above, is usually operated at a frequency four to eight times greater than the symbol clock 224. The symbol clock 224 is generated by the clock generator 218 by means of divider circuits in a manner known in the art. The synthesizer clock 230 is used by the RF transmitter 214 to synthesize the RF carrier. The clock generator 218 also provides a CLKO signal 232 externally to facilitate interfacing with its data input. The CLKO signal 232 is derived from the system clock 222 through divider circuits in a manner known in the art. According to alternative embodiments, separate crystal references may be used by RF receiver 404 and digital receiver 416 in place of the phase-locked clock generator 454.

The control interface section 220 implements the RF interface 226, external interface 228, and the logical operations (internal control/configuration) 236. The RF interface 226 serves to control the RF transmitter 214, such as by setting the channel frequency and transmit power of the RF transmitter 214. A non-volatile configuration memory 238 allows configuration of various parameters in the receiver through the memory interface 240. For robust reception in the presence of interference in shared bands, such as, but not limited to, the Industrial Scientific Medical (ISM) band, RF transmitter 214 may be configured using RF interface 226 to transmit using a carrier frequency having the following specific center frequencies:

5.165 Giga Hertz (GHz), 5.19 GHz, 5.21 GHz, 5.23 GHz, 5.25 GHz, 5.27 GHz, 5.29 GHz, 5.31 GHz, 5.335 GHz, 5.735 GHz, 5.755 GHz, 5.775 GHz, 5.795 GHz, 5.815 GHz, 2.427 GHz, 2.4245 GHz or 2.425 GHz, 2.457 GHz, 2.4495 GHz or 2450 GHz, 2.47275 GHz or 2473 GHz.

Thus, according to embodiments of the present invention, the signal may be transmitted from the transmitter to the receiver on a carrier frequency within a shared band of frequencies. The shared band may have designated channels with designated bandwidths. A first designated bandwidth of a first channel may end at a first predetermined frequency within the shared band. A second designated bandwidth of a second channel may begin at a second predetermined frequency within the shared band. The carrier frequency may be centered between the first predetermined frequency and the second predetermined frequency. In some cases, the first predetermined frequency and the second predetermined frequency may have the same frequency. The beginning and ending of a channel's designated bandwidth may be defined, for example, to be at respective 10 dB down points of the designated bandwidth.

Figure 4:
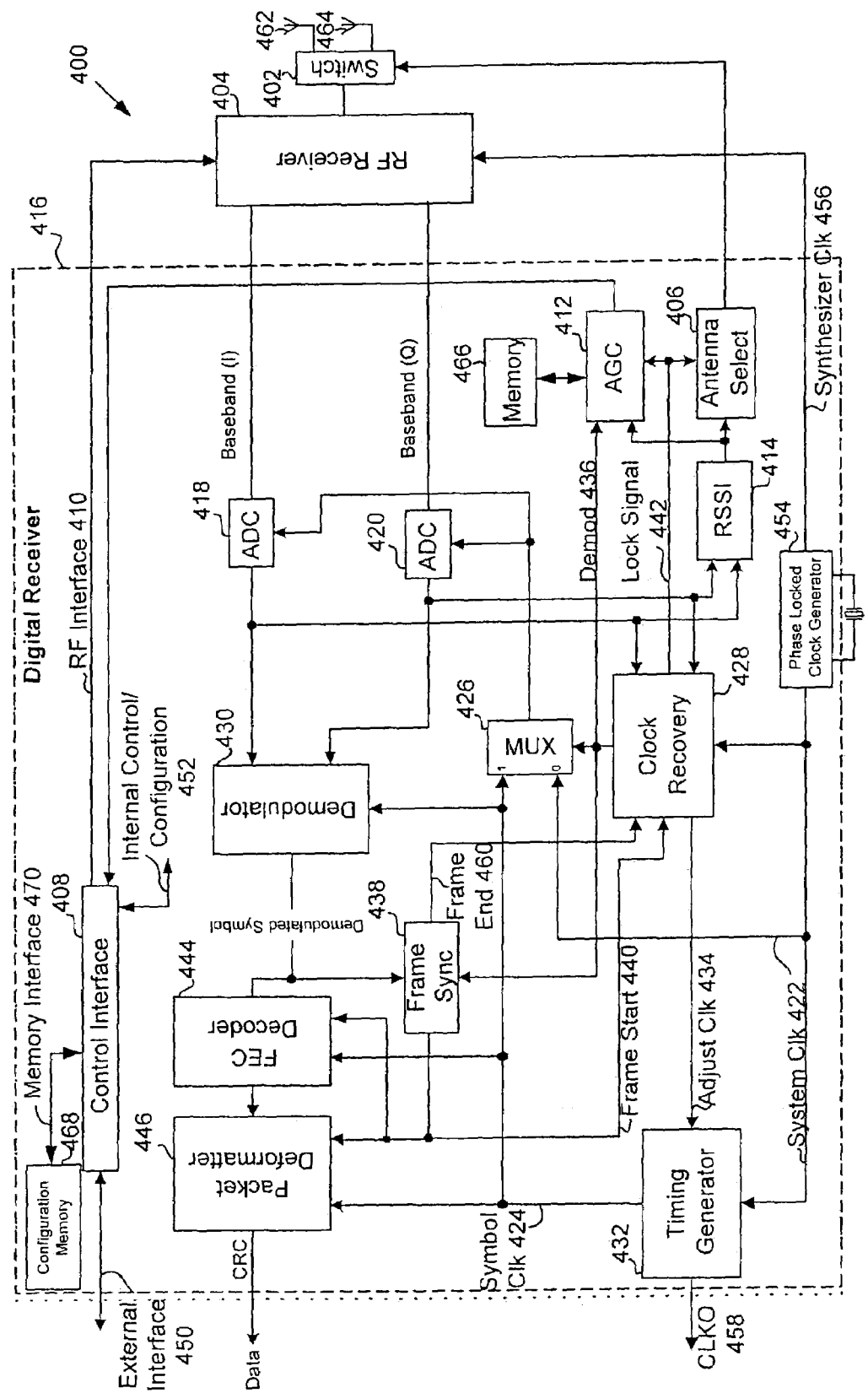
FIG. 4 shows an exemplary receiver that may be employed with embodiments of the present invention.

Referring to FIG. 4, an exemplary receiver 400 that may be employed with embodiments of the present invention is shown. The input of the receiver 400 consists of an antenna switch 402 that selects one of the two antennas 462, 464, depending on the received signal strength indicator (RSSI) value. The decision logic to determine which antenna is being selected is implemented in the antenna select section 406. The output of the antenna switch 402 is then processed by the RF receiver 404.

The configuration of the RF receiver 404 is set by the control interface section 408 through the RF interface 410, which may be implemented by methods known in the art. The gain of the RF receiver 404 is set by the automatic gain control (AGC) section 412, which determines the gain settings based on the output of the RSSI section 414. The AGC section 412 may communicate with a local memory 466 for storing gain settings, determined total receiver gain, and the like. The gain setting is performed through the control interface section 408. The outputs of the RF receiver 404 are the in-phase (I) and quadrature (Q) components of the baseband received signal. A non-volatile configuration memory 468 allows configuration of various parameters in the receiver through the memory interface 470.

In the digital receiver 416, two ADCs 418, 420 may be employed to digitize, respectively, the I and Q received baseband signals at the rate of the system clock 422 or the symbol clock 424, depending on which input lines to the multiplexer (MUX) 426 are selected. The control of the MUX 426 is performed by the clock recovery section 428. The demodulator 430 uses the digital I and Q data to recover the transmitted symbols using methods known in the art. According to embodiments of the present invention, because, as discussed above, the preamble 302 and the data blocks 310 and associated CRCs 312 of the packet 300 (FIG. 3) may be modulated using different modulation schemes, the demodulator 430 may support multiple modulation schemes in order to demodulate the different modulations used before and after the SOF field 304 of the packet 300.

Figure 5:
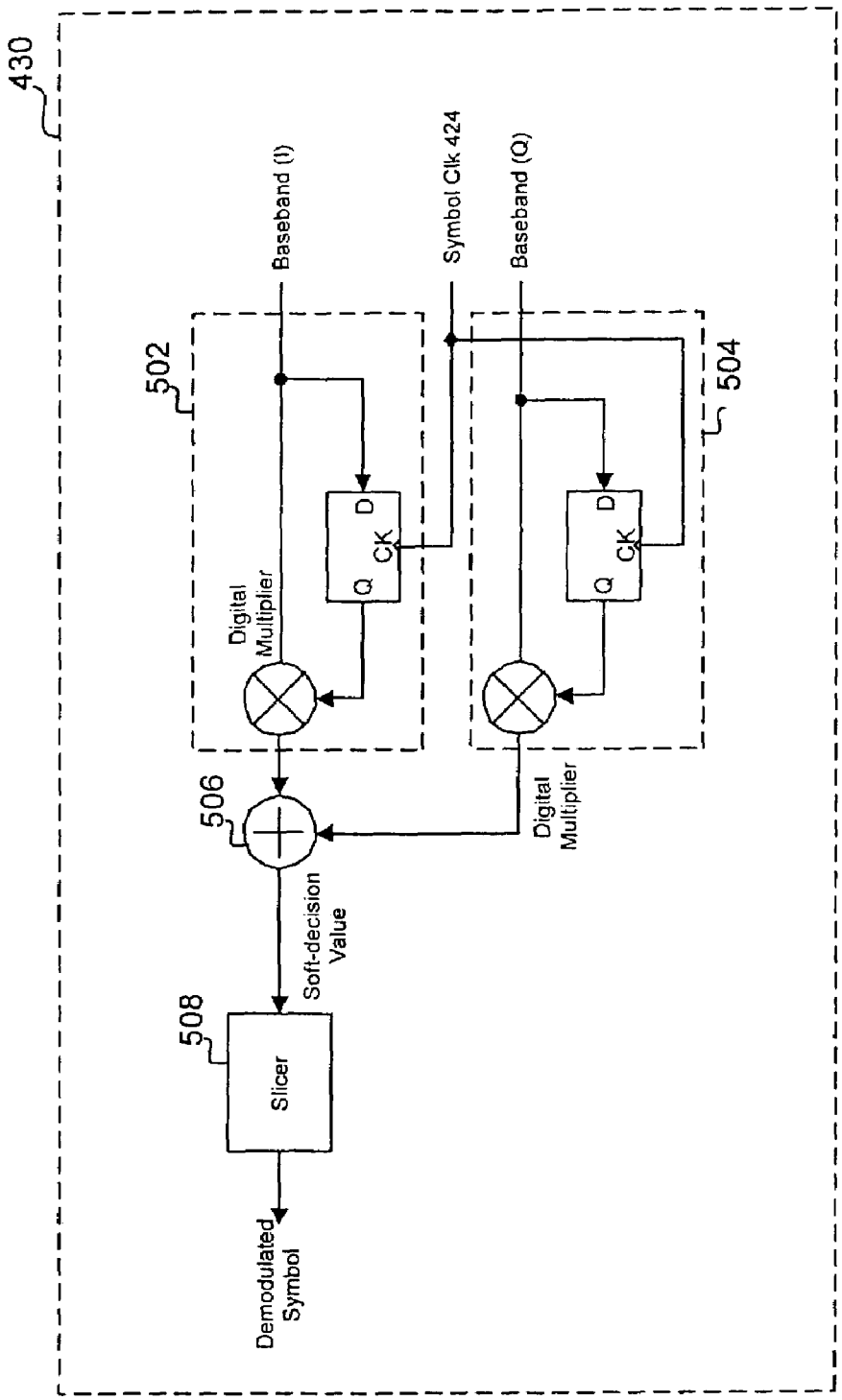
FIG. 5 shows a non-coherent demodulator, according to embodiments of the present invention.

In a preferred embodiment, a non-coherent demodulator such as that shown in FIG. 5 may be used as the demodulator 430. However, any suitable demodulator may be employed with embodiments of the present invention. The non-coherent demodulator shown in FIG. 5 comprises two differential detectors 502, 504. The registers of the two differential detectors 502, 504 are clocked at the rate of the symbol clock 424. Each detector multiplies a channel of the received baseband signal by a version of the signal that has been delayed by the period of the symbol clock 424. The two outputs of the detectors are summed at adder 506 to form a soft decision value. The soft decision value is sent to slicer 508 so that a symbol decision may be made. The slicer 508 takes the soft decision value and generates a demodulated symbol.

The non-coherent demodulator shown in FIG. 5 may demodulate differentially encoded BPSK signals. For BPSK, the demodulated symbol is either +1, represented by a '0', or −1, represented by a '1'. The slicer 508 may simply take the sign bit of the soft decision value to perform the above mapping.

Referring again to FIG. 4, in order to sample at the appropriate time instant in the demodulator 430, clock recovery section 428 may be used to generate the symbol clock 424. Symbol clock 424 samples ADCs 418, 420 at the optimal sampling point of the symbol duration. Thus, ADCs 418, 420 operate as sampling devices.

Figure 6:
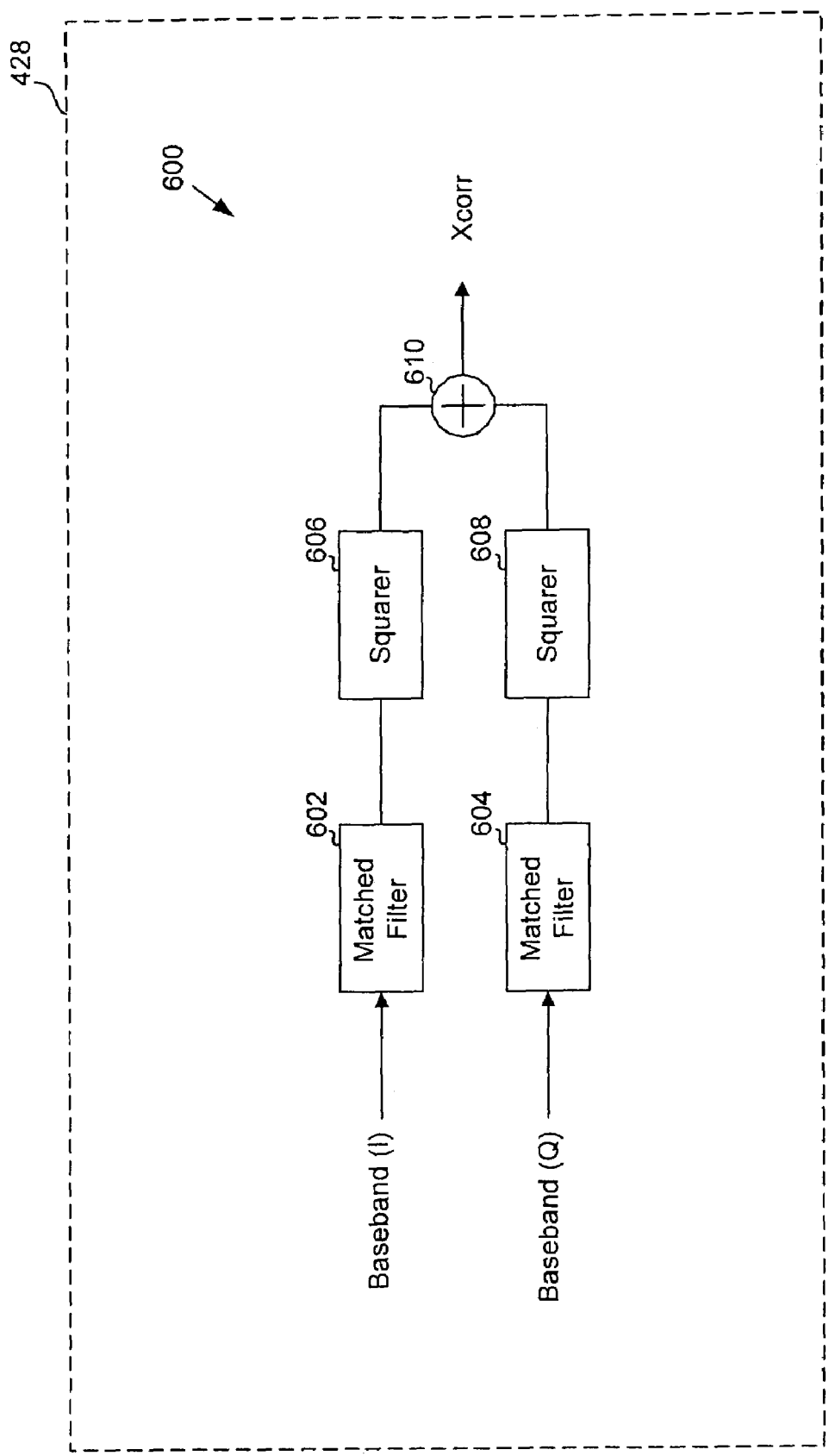
FIG. 6 shows a correlation section within a clock recovery section of the receiver, according to embodiments of the present invention.

A preferred embodiment of a correlation section 600 of the clock recovery section 428 is shown in detail in FIG. 6. The correlation section 600 correlates the I and Q digital baseband signals with the transmitted preamble sequence to determine correlation peaks of the received signal. As shown in FIG. 6, the correlation is performed by employing a pair of matched filters 602, 604. Each of the digitized baseband I and Q data is first filtered by matched filters 602, 604 and then squared by squarers 606, 608, respectively. The outputs of the squarers 606, 608 are added at adder 610 to form the correlation output (Xcorr). Correlation peaks of Xcorr are determined and used to generate an adjust signal 434. The adjust signal 434 aligns the phase of the receiver clock with that of the transmitter clock.

Figure 7:
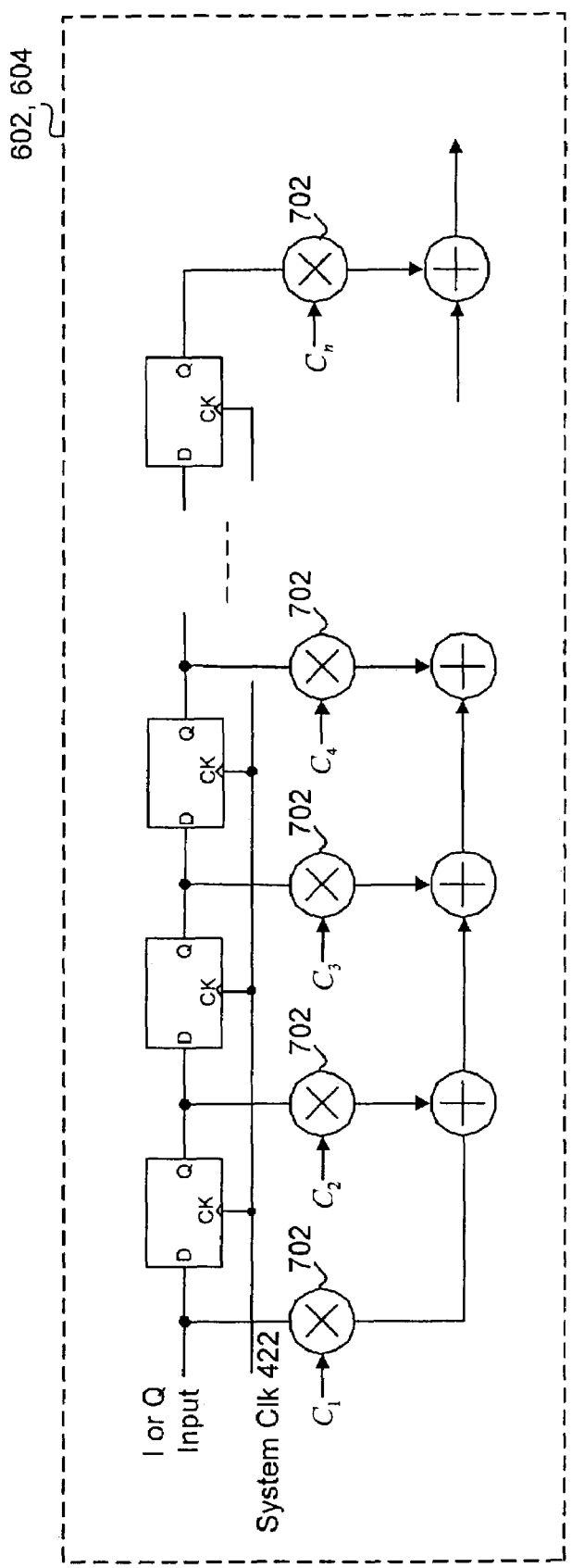
FIG. 7 shows a matched filter that may be employed in the correlation section of FIG. 6, according to embodiments of the present invention.

An embodiment of a matched filter that may be employed as matched filters 602, 604 is shown in detail in FIG. 7. The matched filters 602, 604 may be implemented as a finite impulse response (FIR) filter whose coefficients are equal to the time reverse of the preamble sequence. In other words, for a preamble 302 (FIG. 3) based on the 11-bit Barker sequence and given that the clock recovery section 428 equals the system clock rate, the coefficients should be:

$$\{C_1, C_2, \ldots, C_n\} = \{+1,-1,+1,+1,-1,+1,+1,+1,-1,-1-1\}.$$

All registers are clocked at the system clock 422 rate.

When the over-sampling ratio $N_{os}$ (system clock rate divided by symbol clock rate) is greater than one, each tap value of the FIR filter is repeated by $N_{os}$ times. As an example, when $N_{os}$ is four, the coefficients for an 11-bit Barker sequence become:

$$\{C_1, C_2, \ldots, C_{44}\} = \{1,1,1,1,-1,-1,-1,-1,1,1,1,1,1,1,\\ 1,1,-1,-1,-1,-1,1,1,1,1,1,1,1,1,1,1,1,1,-1,-1,-\\ 1,-1,-1,-1,-1,-1,-1,-1,-1,-1\}.$$

Figure 8:
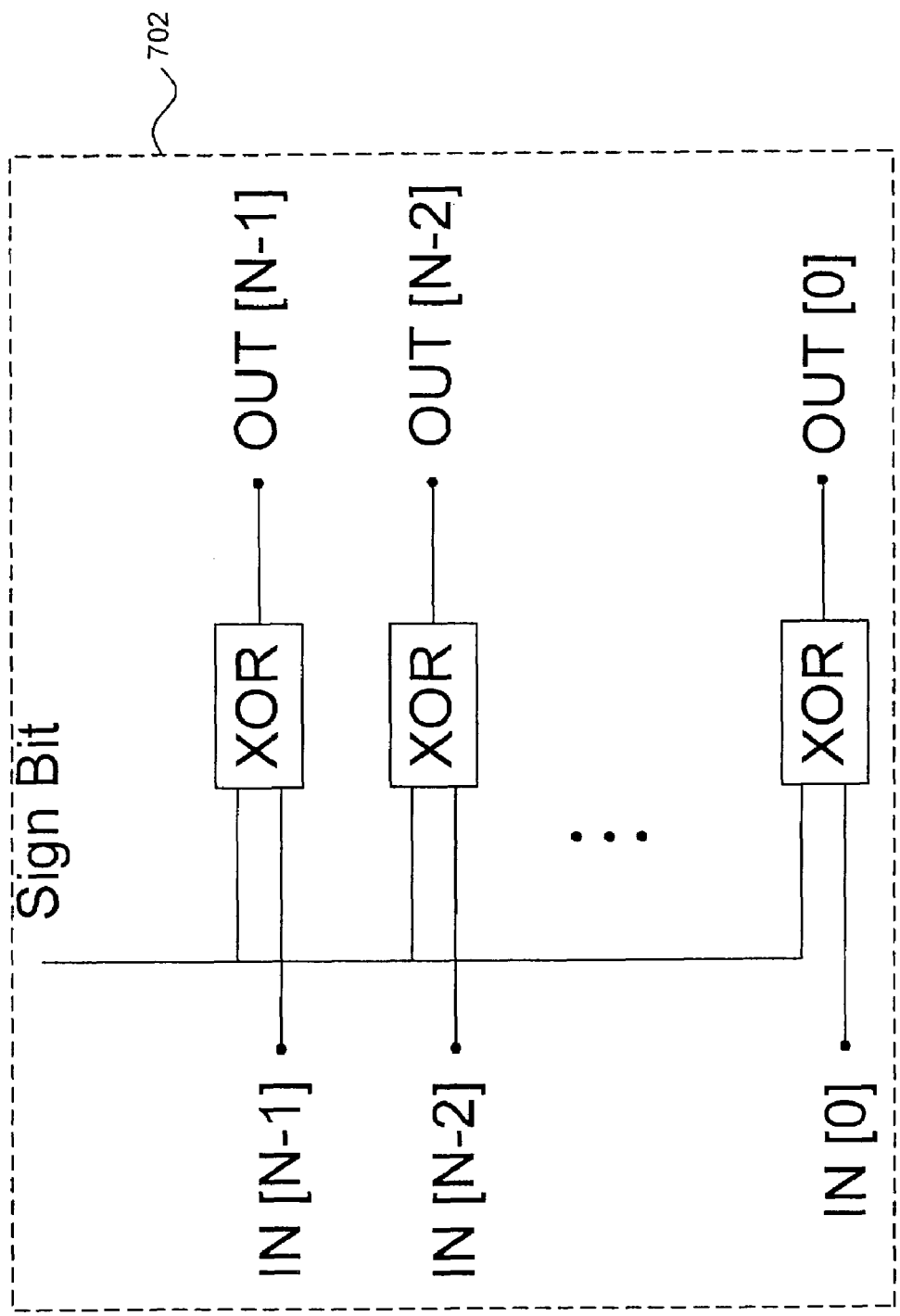
FIG. 8 shows tap multipliers of the matched filter in FIG. 7, according to embodiments of the present invention.

Because the tap values are either +1 or −1, tap multipliers 702 may be implemented in a preferred embodiment as an N bit XOR (or one's complement sign inversion), as shown in FIG. 8, where one input of the XOR in each bit slice is controlled by the sign bit of the input to the XOR while the other input of the XOR in each bit slice is connected to the corresponding input bit. The sign bit is that of the tap coefficient.

In other embodiments (not shown), a two's complement inversion may be implemented by tying the carry-in of each adder to the sign bit of the tap coefficient. For a fixed set of coefficients, XOR can be eliminated and a direct connection for a tap coefficient of +1 or an inverter for a tap coefficient of −1 may be implemented.

As discussed above, the adjust signal 434 aligns the phase of the receiver clock with that of the transmitter clock. After adjustment of the receiver clock phase by the adjust signal 434, demodulation (demod) signal 436 is generated to select the symbol clock 424 for clocking the ADCs 418, 420 to sample the received signal. Prior to generation of the demod signal 436, the system clock 422 is used to clock ADCs 418, 420. The demod signal 436 also triggers the frame synchronization section 438 to determine when a frame starts based on the SOF field 304 (FIG. 3). A frame start signal 440 is issued by frame synchronization section 438 at the start of each frame. A frame may be defined as the end of the SOF field 304 and the start of the first bit of the header 306. A lock signal 442 is generated by the clock recovery section 428 to indicate to the AGC section 412 and antenna select section 406 that the receiver has successfully recovered the transmitted clock.

The demodulated symbols are sent from demodulator 430 to an FEC decoder 444 to recover the originally transmitted data. The FEC decoder 444 uses the symbol clock 424 to generate the clocks required to decode the demodulated data. The FEC decoder 444 may be implemented with methods known in the art. The decoded data is then sent to the packet deformatter section 446. The packet deformatter section 446 takes the demodulated symbols and deformats the packet 300 into its header, data, and command (if any). The length field information in the header 306, if available, is used to deformat the packet 300. The packet deformatter section 446 uses the frame start signal 440 and symbol clock 424 to strip out the header 306 and CRC 308 of packet 300. In some embodiments, the received data may be buffered in a first-in-first-out (FIFO) memory (not shown). According to embodiments of the present invention, the length field may be deleted so that the packet deformatter section 446 can still deformat the packet when the header is in error. The CRCs 312 for each of the data blocks 310 may be used for error control. The error control scheme used can be customized to the particular needs of the system. In some embodiments, a FIFO may be used to buffer the received data blocks 310.

The control interface section 408 implements the RF interface 410, external interface 450, and the logical operations (internal control/configuration) 452. The RF interface 410 serves to control the RF receiver 404, such as by setting the channel frequency and transmit power of the RF receiver 404.

A phase-locked clock generator 454 generates the system clock 422 and the synthesizer clock 456. (As discussed above, according to alternative embodiments, separate crystal references may be used by RF receiver 404 and digital receiver 416 in place of the phase-locked clock generator 454.) The system clock 422 is the over-sampled clock and may have a frequency four to eight times greater than the symbol clock 424. The symbol clock 424 is generated by the timing generator section 432 by means of divider circuits in a manner known in the art. The synthesizer clock 456 is used by the RF receiver 404 to synthesize the RF carrier. The timing generator section 432 also provides a CLKO signal 458 externally to facilitate interfacing with its data output. The CLKO signal 458 is derived from the system clock 422 through divider circuits in a manner known in the art.

As discussed above, the correlation output (Xcorr) shown in FIG. 6 is used by the clock recovery section 428 to generate an adjust signal 434 by searching for the peak of Xcorr. The adjust signal 434 is used by the timing generator section 432 to set a sampling clock having the symbol rate (symbol clock 424) to a certain phase According to embodiments of the present invention, the generation of the adjust signal 434 is performed in two stages, as shown in the state diagram of FIG. 9. In the first stage (the left-half of FIG. 9), a lock clock 1020 is generated based on the clock recovery section 428 output (Xcorr) (see FIG. 10). More specifically, a determination is made whether Xcorr is equal to or greater than a certain threshold $V_0$ and enable is equal to '1' (S902). If Xcorr is not greater than $V_0$ (No), S902 is repeated. On the other hand, if Xcorr is greater than $V_0$ (Yes), Xcorr is searched in order to detect a peak (S904). A determination is then made whether a peak was detected (S906). If a peak is not detected (No), the process is repeated beginning at S902. On the other hand, if a peak is detected (Yes), a lock clock 1020 is generated (S908).

The second stage of the adjust signal 434 generation (the right half of FIG. 9) is performed whenever a lock clock 1020 is generated at S908. According to embodiments of the present invention, a lock clock 1020 should be generated after each period of the synchronization code, for example, after each period of the Barker sequence $N_{Barker}$. In terms of the system clock 422, it should be generated every $N_{Barker}N_{OS}$ system clock 422 cycles.

In the second stage of the adjust signal 434 generation, a determination is made whether demod signal 436 is active (S910). If demod signal 436 is active (Yes), S910 is repeated. On the other hand, if demod signal 436 is not active (No), the duration of a predetermined number N of lock clock 1020 (i.e., a predetermined number N of peaks) is determined (S912). A counter or incrementer may be incremented after each lock clock 1020. Thus, the counted number of lock clocks 1020 may be determined at a particular point in time by checking the value of the incrementer.

It is then determined how many system clock 422 cycles have been expended (i.e., the duration of time required) to reach the predetermined number N of lock clocks 1020. A determination is then made whether the determined duration meets a predetermined criteria (S914). The duration of a period of the synchronization code is known. Thus, the predetermined criteria may be that the number of system clock 422 cycles that have been expended should be equal to the number of periods of the synchronization code that were detected multiplied by Nos. If the determined duration does not meet the predetermined criteria (No), the process repeats beginning at S910. On the other hand, if the determined duration meets the predetermined criteria (Yes), an adjust signal 434 is generated (S916). It is then determined whether clock recovery section 428 has been disabled (S918). If clock recovery section 428 has not been disabled (No), the first and second stages of the process may be repeated. On the other hand, if it is determined that clock recovery section 428 has been disabled (Yes), the process shown in FIG. 9 terminates.

Figure 9:
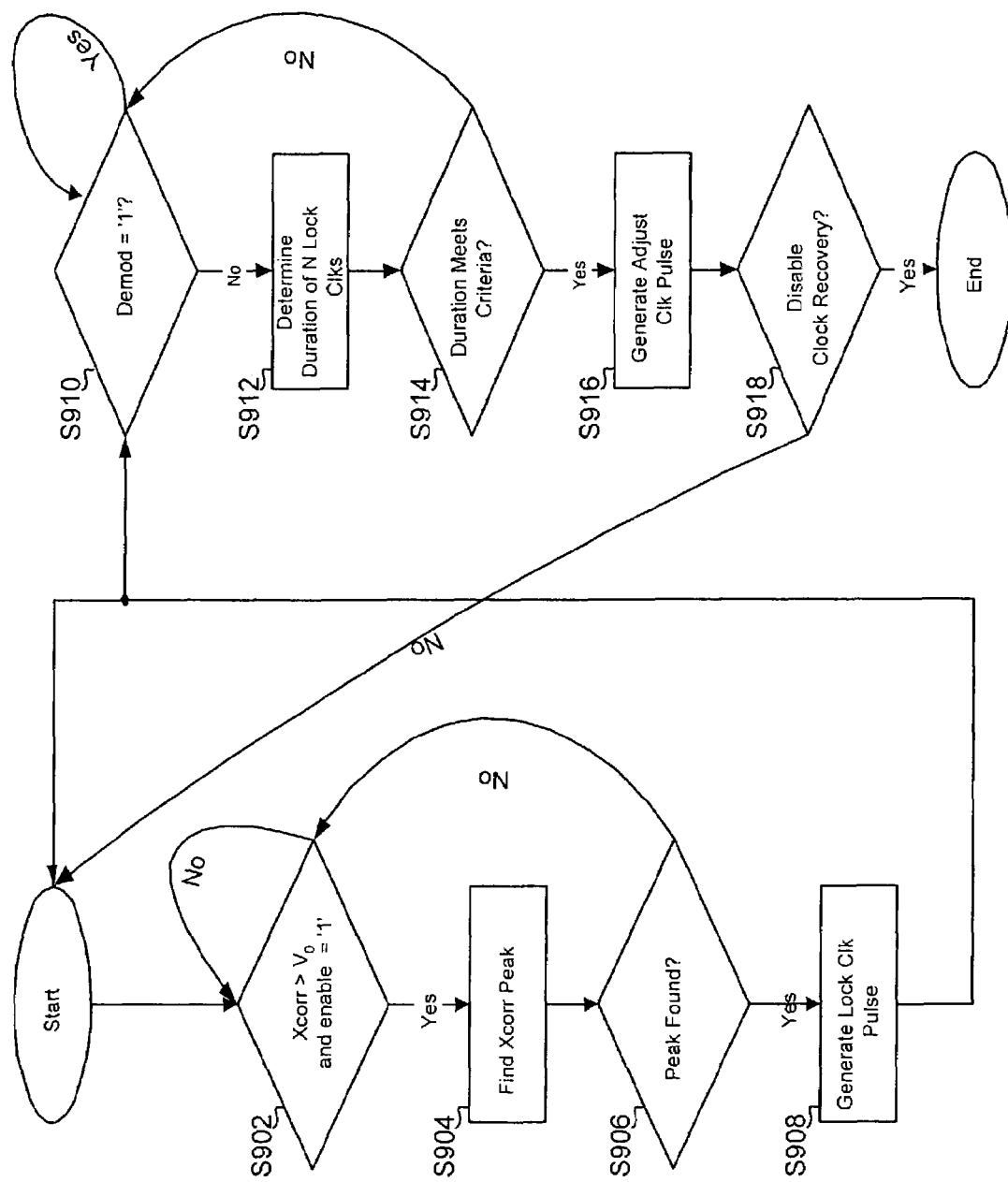
FIG. 9 shows a state diagram for the generation of the adjust signal, according to embodiments of the present invention.
Figure 10:
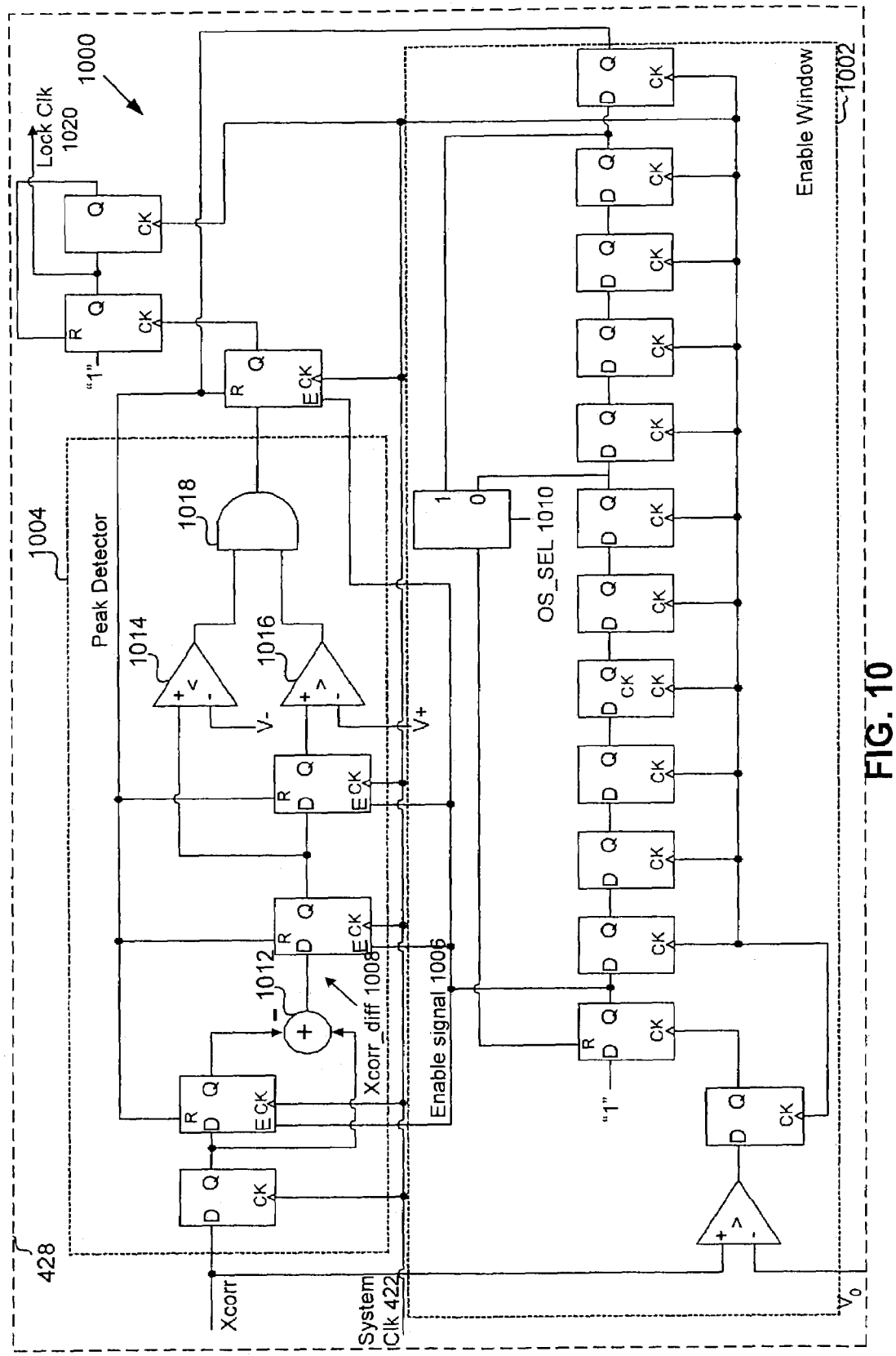
FIG. 10 shows a lock clock generation section for implementing the first stage of the process shown in FIG. 9, according to embodiments of the present invention.

Many methods of implementing the process shown in FIG. 9 are possible. An embodiment of a lock clock generation section 1000 for implementing the first stage of the process shown in FIG. 9, i.e., for generating a lock clock 1020, is shown in FIG. 10. As shown in FIG. 10, lock clock generation section 1000 forms a portion of clock recovery section 428. Lock clock generation section 1000 comprises an enable window section 1002 and a peak detector section 1004. If Xcorr exceeds a certain predetermined threshold $V_0$, an enable signal 1006 is generated by the enable window section 1002 to enable the peak detector section 1004. The enable window section 1002 generates a time window of two different durations, depending on the status of the over-sampling select line (OS_SEL) 1010.

According to embodiments of the present invention, to find an Xcorr peak, two adjacent Xcorr samples are subtracted at subtractor 1012 to generate a difference signal (Xcorr_diff 1008) that should have a positive value immediately followed by a negative value. As shown in FIG. 10, adjacent Xcorr samples are separated by one period of the system clock 422. When this specific waveform property is detected by the comparators 1014, 1016 in the peak detector section 1004, a trigger signal is generated through AND gate 1018 to the one-shot, which produces the lock clock 1020 (lock clk 1020), i.e., a pulse.

In the second stage (the right half of FIG. 9), a verification process is performed that determines if the lock clocks 1020 are generated regularly, according to the period of the synchronization code. As discussed above, a criterion for determining if the lock clocks 1020 are generated regularly may be whether the total duration of N lock clocks 1020 is within some pre-defined bounds. When this criterion is met, an adjust signal 434, i.e., a pulse, is generated to re-align the phase of the symbol clock 424 for optimal timing.

Figure 11:
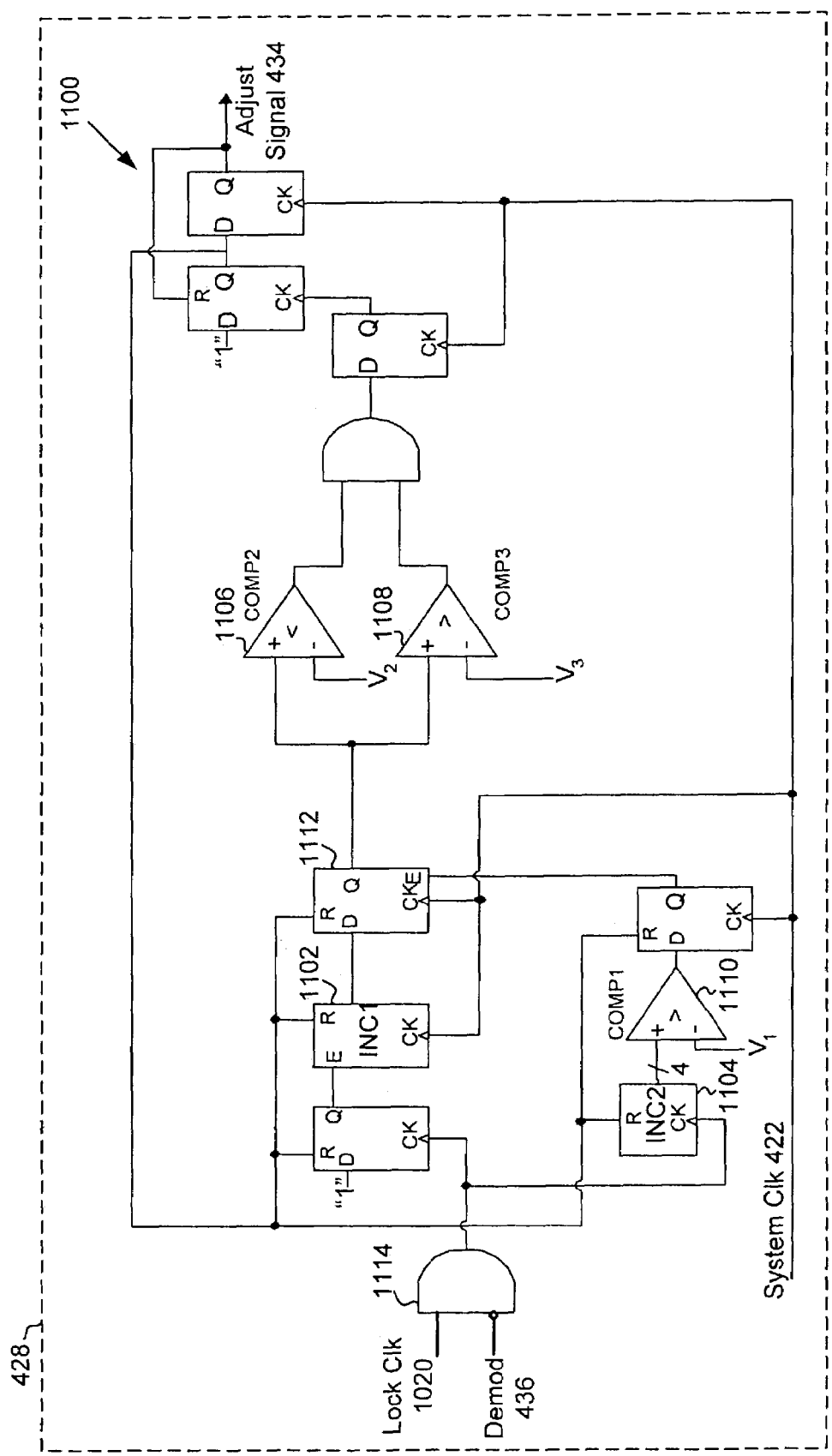
FIG. 11 shows an adjust signal generation section for implementing the second stage of the process shown in FIG. 9, according to embodiments of the present invention.

Referring now to FIG. 11, an embodiment of an adjust signal generation section for implementing the second stage of the process shown in FIG. 9 is shown. As shown in FIG. 11, adjust signal generation section 1100 forms a portion of clock recovery section 428. Adjust signal generation section 1100 generates the adjust signal 434 when a sufficient number of lock clocks 1020 have been generated as determined by a predetermined threshold $V_1$. The first lock clock 1020 triggers an enable signal to incrementer 1 (INC1) 1102 and triggers an increment in incrementer 2 (INC2) 1104. The INC1 1102 and the INC2 1104 both count up by one every time their clock goes from low to high. The INC1 1102 will continue to increment at the system clock 422 rate. However, the output of INC1 1102 is not provided to comparator 2 (COMP2) 1106 and comparator 3 (COMP3) 1108 until the output of INC2 1104 exceeds $V_1$, as detected by comparator 1 (COMP1) 1110.

The output of INC2 1104 exceeding $V_1$ indicates that a sufficient number of lock clocks 1020 have been detected. When this condition occurs, the register 1112 following INC1 1102 is enabled and the output of INC1 1102 is compared against $V_2$ and $V_3$ on the next system clock 422 cycle. If the output of INC1 1102 is less than $V_2$ and greater than $V_3$, then the one-shot circuit is triggered to generate the adjust signal 434.

The AND gate 1114 is used to gate the lock clocks 1020 so that when the demod signal 436 is active, no lock clocks 1020 are gated through the AND gate 1114. This allows adjust signal generation section 1100 to ignore any false correlation peaks that could arrive after demodulation begins.

Figure 12:
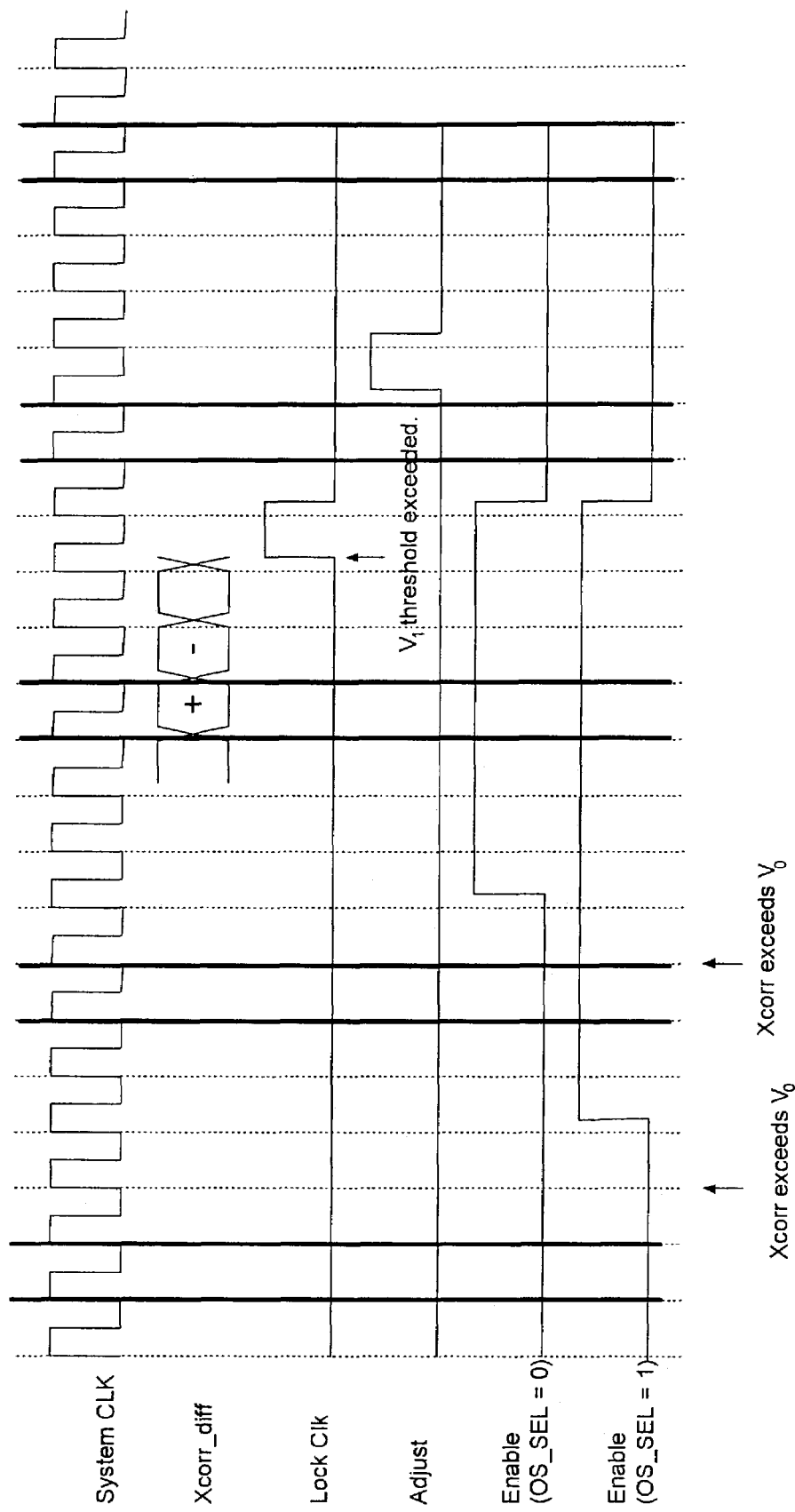
FIG. 12 shows a timing diagram of various signals shown in FIGS. 10 and 11, according to embodiments of the present invention.

A timing diagram of various signals shown in FIGS. 10 and 11, including the lock clock 1020 and adjust signal 434, is illustrated in FIG. 12. The plus and minus signs shown in the Xcorr_diff 1008 signal represent the positive value immediately followed by the negative value that was discussed above in relation to FIG. 10.

Given correct timing, the number of system clock 422 cycles until the output of INC1 1102 is passed on to COMP2 1106 and COMP3 1108 should be $V_1 * N_{barker} * Nos + D$, where $V_1$ is a predetermined threshold, $N_{barker}$ is a number of periods of the Barker sequence, Nos is oversampling ratio and D is a fixed delay due to hardware implementation. The thresholds $V_2$ and $V_3$ should be set to include this value with some margin, which is set depending on the operation conditions specific to a particular application.

Figure 13:
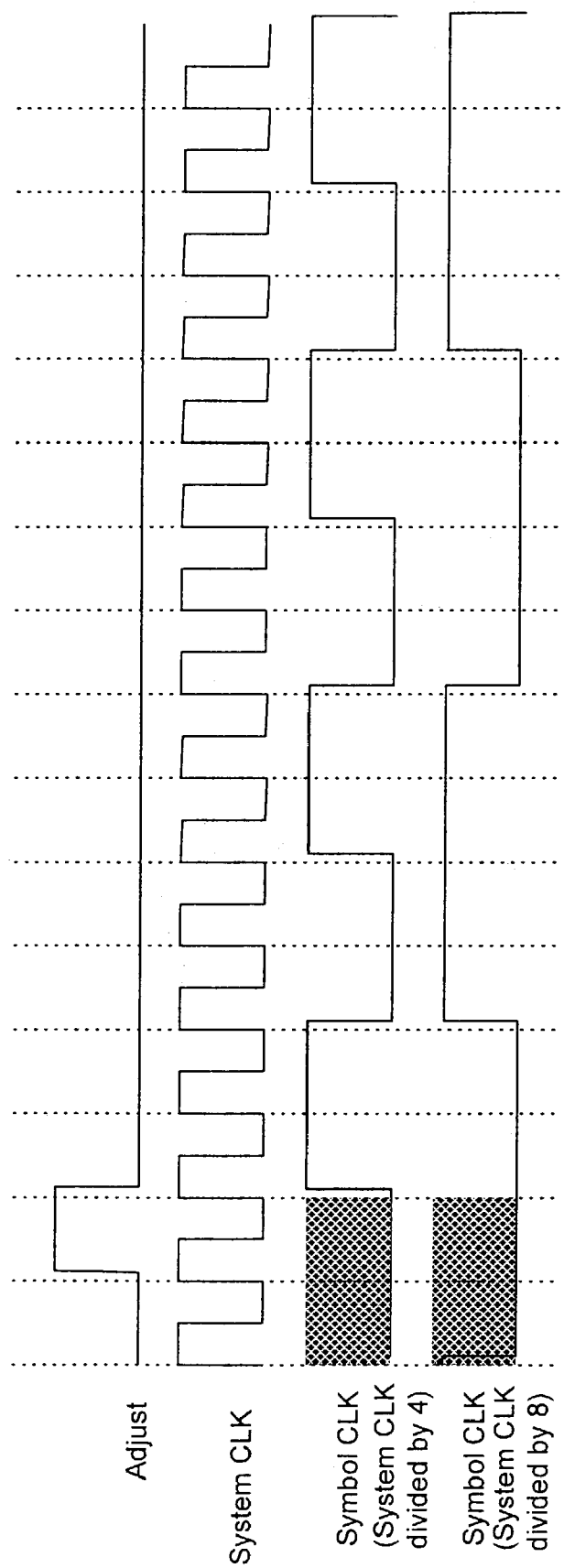
FIG. 13 shows a timing diagram of an adjust signal, the system clock and the symbol clocks, according to embodiments of the present invention.

As discussed above and as shown in the timing diagram of FIG. 13, the adjust signal 434 from the clock recovery section 428 is used to set the symbol clock 424 to a certain phase. In FIG. 13, the hatched portions of the symbol clocks represent a "don't care" condition. In other words, the state of the symbol clocks before the adjust signal 434 is generated is not important.

Figure 14:
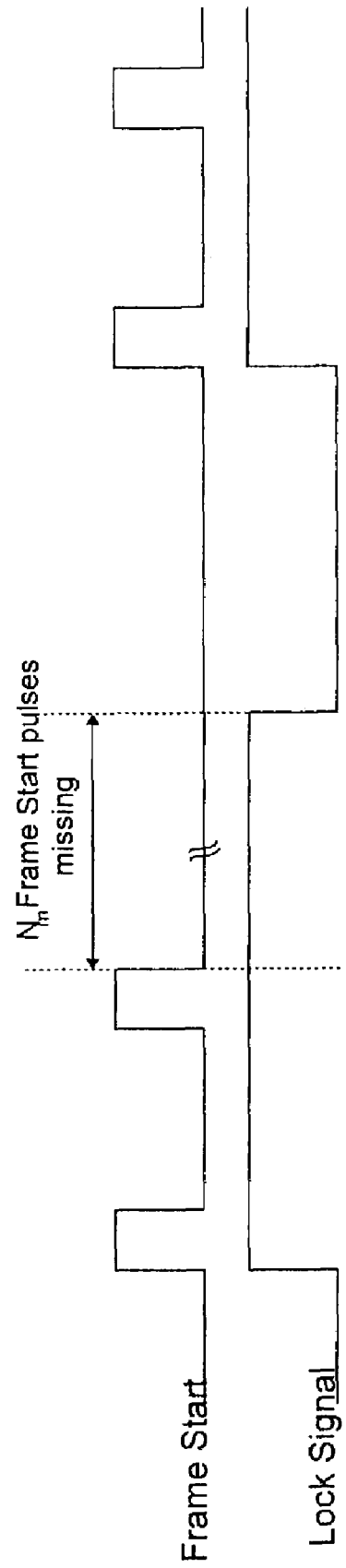
FIG. 14 shows a timing diagram of a start of frame signal and a lock signal, according to embodiments of the present invention.
Figure 15:
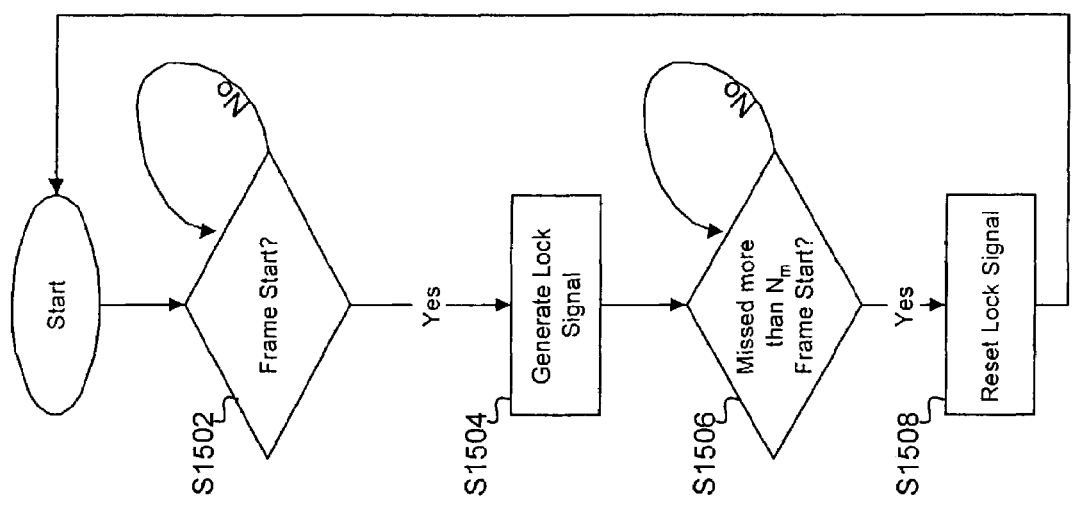
FIG. 15 shows a state diagram of lock signal generation, according to embodiments of the present invention.

Referring to the timing diagram of FIG. 14, it can be seen that the lock signal 442 (FIG. 4) is generated immediately after the rising edge of the frame start signal 440, according to embodiments of the present invention. The state diagram of lock signal 442 generation is shown in FIG. 15. As shown in FIG. 15, it is first determined whether a frame start signal 440 is issued (S1502). If a frame start signal 440 is not issued (No), S1502 is repeated. On the other hand, if a frame start signal 440 is issued (Yes), a lock signal 442 is generated (S1504). It is then determined whether $N_m$ consecutive frame start signals 440 have not been detected, i.e., are missing (S1506), as shown in FIG. 14. If $N_m$ consecutive frame start signals 440 are not missing (No), S1506 is repeated. On the other hand, if $N_m$ consecutive frame start signals 440 are missing (Yes), the lock signal 442 is reset and the process is repeated beginning at S1502. The lock signal 442 is used by the AGC section 412 and the antenna select section 406 to determine times for enabling an AGC loop.

Figure 16:
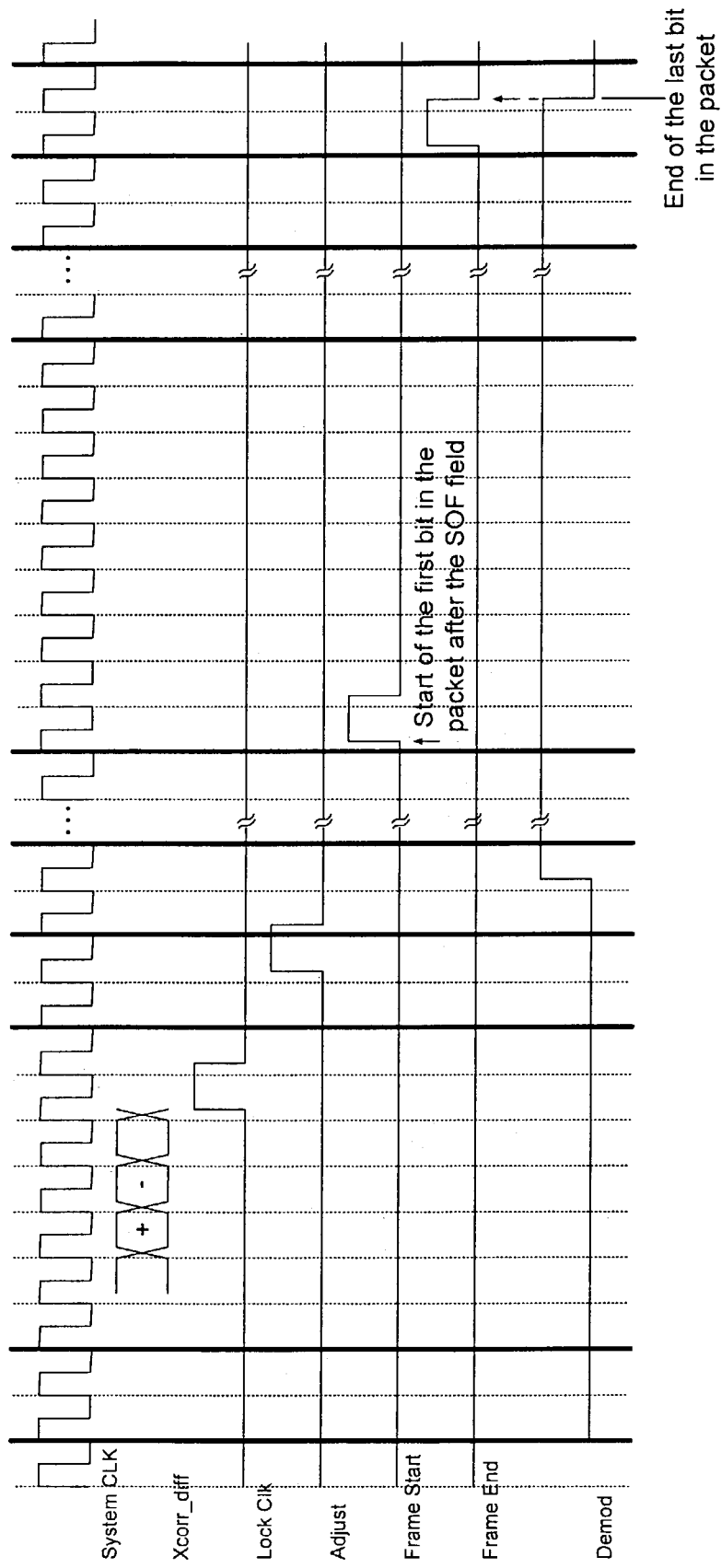
FIG. 16 shows a timing diagram of various signals, including the adjust signal, the lock clock signal and the demodulation signal, according to embodiments of the present invention.

According to embodiments of the present invention, the state diagram shown in FIG. 15 may be implemented by digital hardware in a manner known in the art such that the frame start signal 440 and frame end signal 460 are generated according to the timing diagram shown in FIG. 16. The Xcorr_diff signal shown in FIG. 16 is the output of the subtractor 1012 (FIG. 10). The plus and minus signs shown in the Xcorr_diff signal represent the positive value immediately followed by a negative value that was discussed above in relation to FIG. 10.

The demod signal 436 (FIG. 4) is generated one system clock 422 cycle after the falling edge of the adjust signal 434, as shown in the timing diagram of FIG. 16. The demod signal 436 allows the receiver to sample the ADCs 418, 420 at the correct symbol timing by using the time-adjusted symbol clock 424. The demod signal 436 must be set low (i.e., inactive) again after the entire frame has been received so that the clock recovery system can use the system clock 422 to perform timing adjustments. This is done by using the frame end signal 460 from the frame synchronization section 438 to reset the demod signal 436. The generation and deactivation of the demod signal 436 is based on the frame start signal 440 and the frame end signal 460, as well as other signals (for example, the "no match" condition) from the frame synchronization section 438, as shown in FIG. 17.

Figure 17:
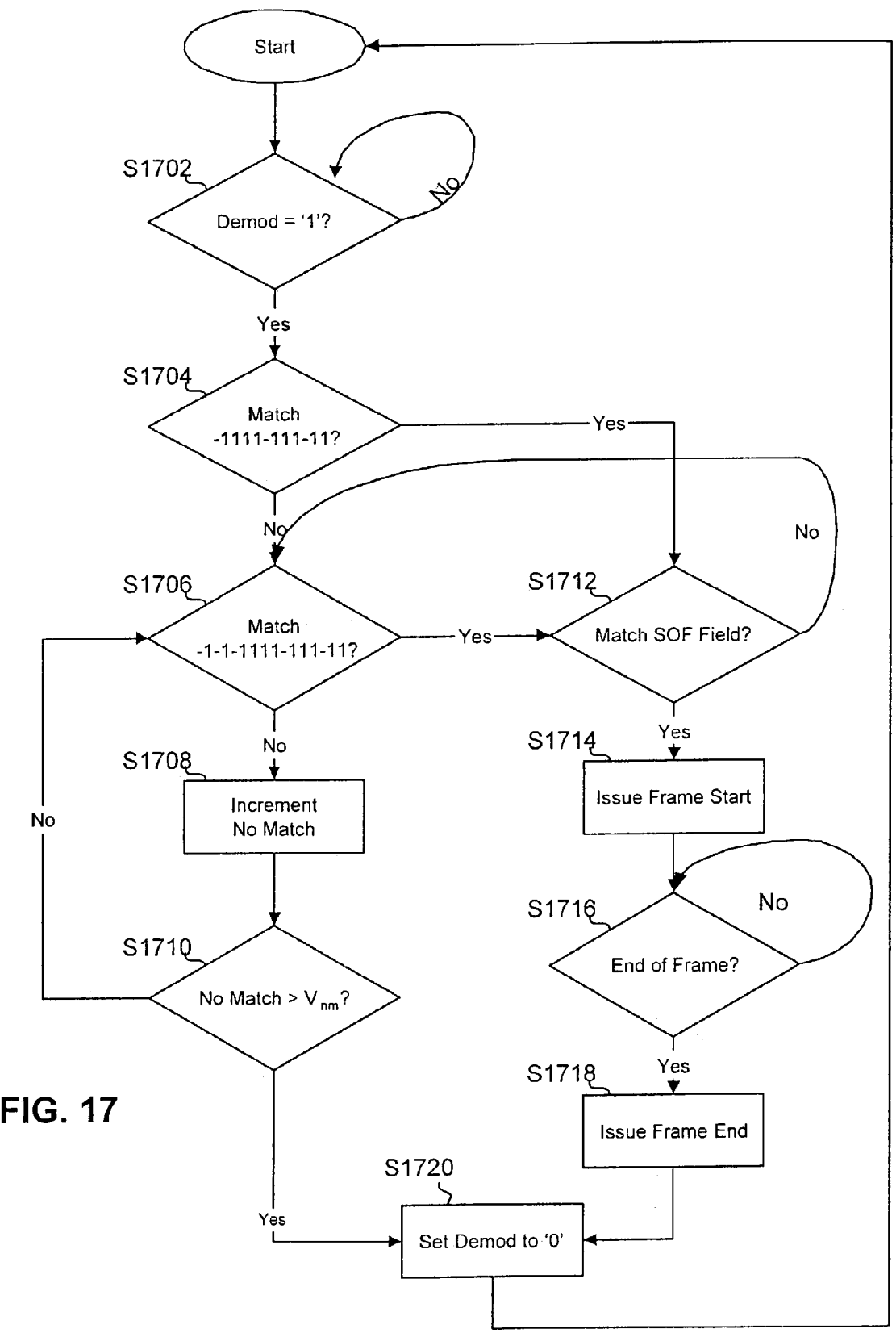
FIG. 17 shows a state diagram for a frame synchronization section, according to embodiments of the present invention.

FIG. 17 shows a state diagram for the frame synchronization section 438. As shown in FIG. 17, according to embodiments of the present invention, the frame synchronization section 438 first determines whether the demod signal 436 is in the high (i.e., active) state (S1702). The frame synchronization section 438 is enabled by the demod signal 436 when it goes to the active state. If the demod signal 436 is not in the active state (No), S1702 is repeated. On the other hand, if the demod signal 436 is in the active state (Yes), the frame synchronization section 438 attempts to match the pattern -1111-111-11 (S1704). When the synchronization code is a Barker sequence, the pattern -1111-111-11 is a portion of the complete Barker sequence. (According to other embodiments using other synchronization codes, a match may be sought with a suitable portion of a sequence of other synchronization codes.)

If a match is made (Yes), the frame synchronization section 438 attempts to match the SOF field 304 (S1712), which in one embodiment is defined to be '000'. If a match is made at S1712 (Yes), then the frame start signal 440 is issued (S1714), as shown in FIG. 16. The frame synchronization section 438 then determines whether the end of frame has been reached (S1716). According to embodiments of the present invention, because the packet 300 (FIG. 3) is of fixed length upon configuration, the end of frame may be determined through a counter that counts the number of bits received since the rising edge of the frame start signal 440. If the count has not reached the number of bits in the packet, i.e., the end of the frame (No), S1716 is repeated. On the other hand, if the count has reached the number of bits in the packet, i.e., the end of the frame (Yes), the frame end signal 460 is issued (S1718). Because the falling edge of the frame end signal 460 should coincide with the end of the final bit in the packet 300, this pulse should be issued immediately after the beginning of the last bit in the packet 300, as shown in FIG. 16. The demod signal 436 is then set to a low (i.e., inactive) state (S1720) and the entire process is repeated beginning at S1702.

On the other hand, if the frame synchronization section 438 does not match either the pattern -1111-111-11 at S1704 (No) or the SOF field 304 at S1712 (No), then it attempts to match the pattern -1-1-1111-111-11, i.e., a complete Barker sequence (S1706). (According to other embodiments using other synchronization codes, a match may be sought with a complete sequence of the other synchronization codes.) If a match is made, i.e., if the complete sequence of the synchronization code is detected (Yes), then S1712 is performed. On the other hand, if a match is not made at S1706, i.e., the complete sequence of the synchronization code is not detected (No), a no-match counter is incremented (S1708).

The frame synchronization section 438 then determines whether the value of the no-match counter exceeds a set threshold $V_{nm}$ (S1710). If the value of the no-match counter does not exceed the set threshold $V_{nm}$ (No), S1706 is repeated. On the other hand, if the value of the no-match counter does exceed the set threshold $V_{nm}$ (Yes), the demod signal 436 is then set to a low (i.e., inactive) state (S1720) and the entire process is repeated beginning at S1702.

Figure 18:
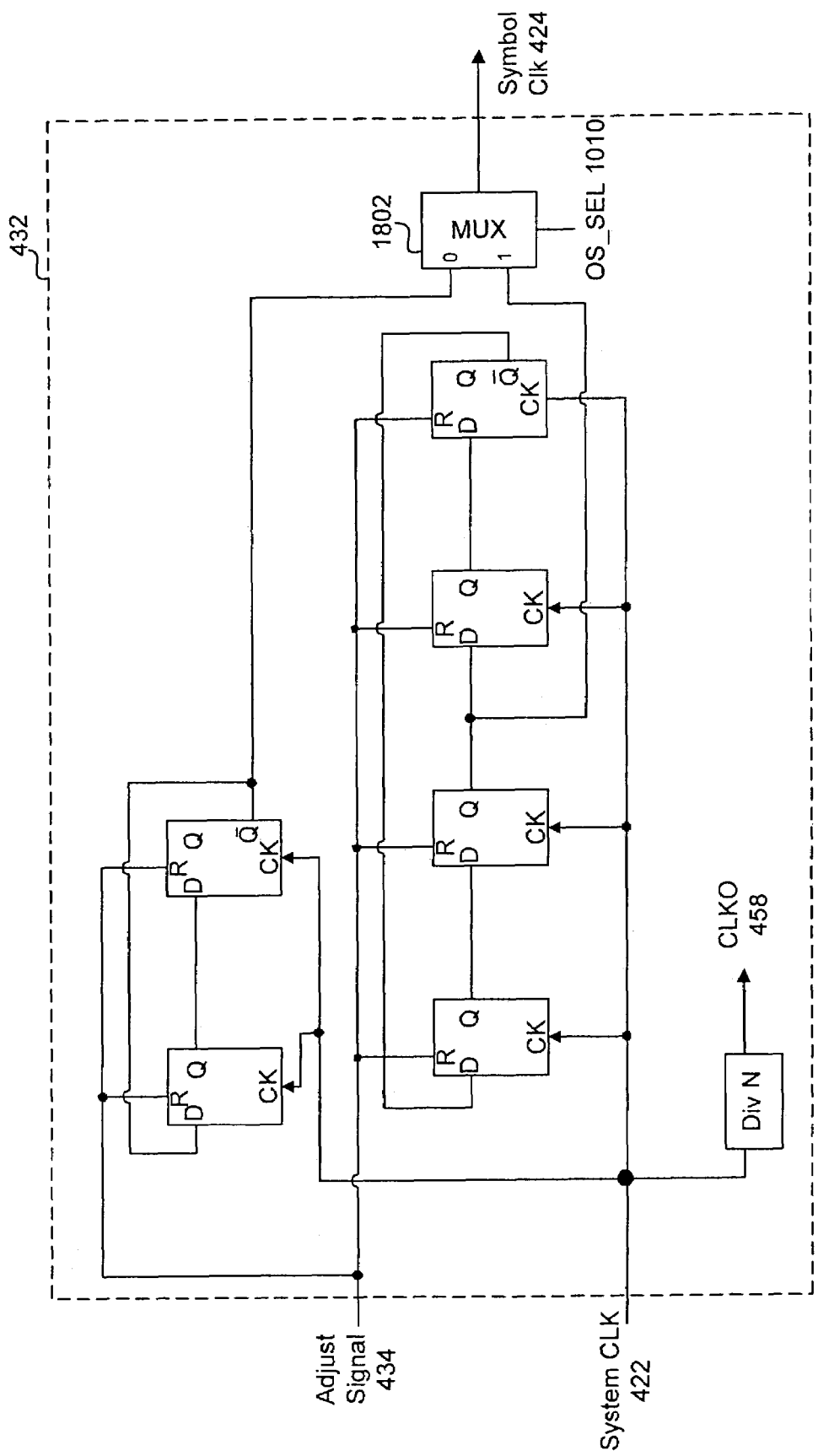
FIG. 18 shows a circuit employed as a timing generator, according to embodiments of the present invention.

Referring now to FIG. 18, an exemplary embodiment of a circuit employed as the timing generator 432 (FIG. 4) is shown. As shown in FIG. 18, the OS_SEL signal 1010 is input to a MUX 1802 to select the divide-by-four signal and the divide-by-eight signal as the symbol clock 424 when OS_SEL 1010 is '0' and '1', respectively. The divide-by-four is implemented by the shift register with two registers and the divide-by-eight is implemented by the shift register with four registers in the manner shown in FIG. 18. According to embodiments of the present invention, all divide-by circuits shown in FIG. 18 are positive-edge triggered and the reset and set in the shift registers should be synchronous.

The AGC and antenna selection in receiver 400 (FIG. 4), according to embodiments of the present invention, will now be described. The reception of the packet 300 (FIG. 3) may be sensitive to fading during transmission. In particular, embodiments of the synchronization method described above are sensitive to the received signal power because certain decisions are made based on correlation levels crossing over certain thresholds. The correlation levels depend on the received signal power. Thus, in order to keep the signal power constant to mitigate fading effects on the demodulation, as well as to make the synchronization robust to fading, embodiments of the present invention may employ AGC and antenna selection.

Figure 19:
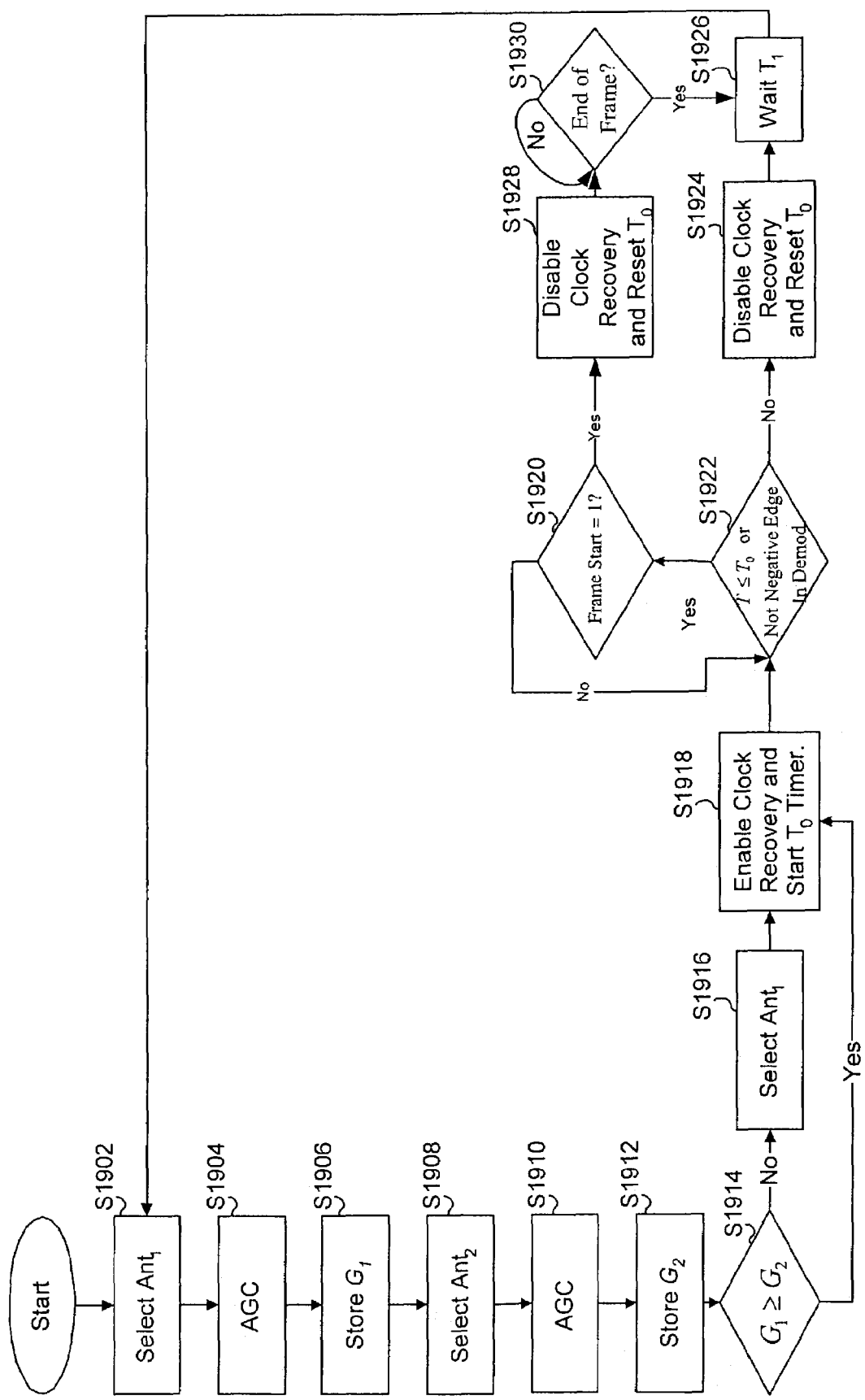
FIG. 19 shows a state diagram for antenna selection control, according to embodiments of the present invention.

According to one preferred embodiment, AGC and antenna selection is controlled according to the state diagram shown in FIG. 19. As shown in FIG. 19, initially the first antenna ($Ant_1$) is selected (S1902). Then, AGC is performed (S1904). The total receiver gain when the first antenna is selected ($G_1$) is then stored (S1906). Next, the second antenna ($Ant_2$) is selected (1908). Then, AGC is again performed (S1910). The total receiver gain when the second antenna is selected ($G_2$) is then stored (S1912). Next, it is determined whether $G_1$ is greater than or equal to $G_2$ (S1914). If $G_1$ is not greater than or equal to $G_2$ (No), $Ant_1$ is selected (S1916) and S1918 is performed. If $G_1$ is greater than or equal to $G_2$ (Yes), then $Ant_2$ remains selected and S1918 is performed.

At S1918, the clock recovery section 428 is enabled. This indicates that the clock recovery section 428 is attempting to lock onto the incoming clock. When the clock recovery section 428 is disabled, the matched filter registers (FIG. 7) are reset and kept at the reset state until enabled again. Alternatively, the I and Q inputs could be gated to logic '0'. $T_0$ indicates the timeout period for the clock recovery function and $T_1$ represents the amount of time to wait before AGC is performed again. According to embodiments of the present invention, while $T_1$ timer has not expired, the transmitter 200 may stop transmission and go into power down mode. Similarly, the receiver 400 could power down while $T_1$ timer has not yet expired.

Figure 20:
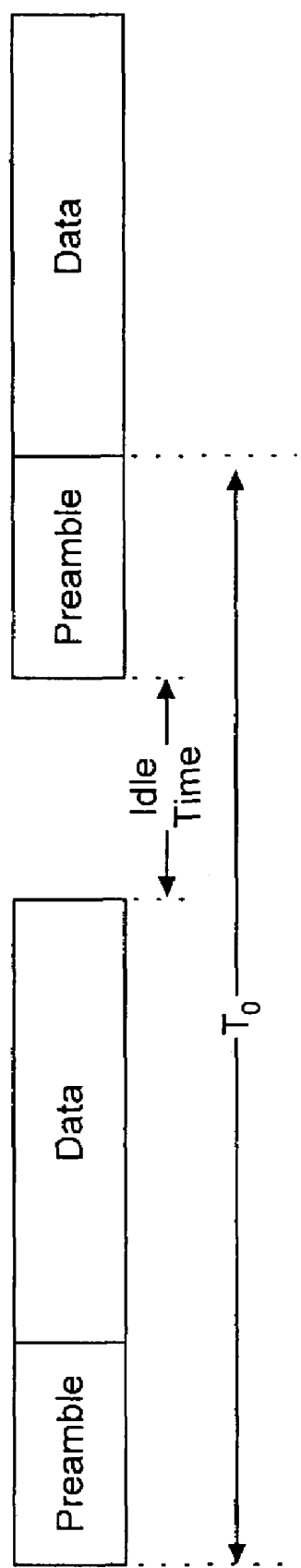
FIG. 20 shows a packet in relation to a timeout period and an idle time for a clock recovery function, according to embodiments of the present invention.

$T_0$ is set to be at least the packet size plus the duration of two preambles and idle time as shown in FIG. 20. $T_0$ is measured relative to after the clock recovery section 428 has been enabled and is measured in units of cycles of the symbol clock 424.

Before the clock recovery section 428 has acquired timing (i.e. lock signal 442 and demod signal 436 are low (i.e., inactive)), $T_1$ is set to be small so that the clock recovery section 428 has more time to lock. The start of $T_1$ is measured relative to the negative edge of the demod signal 436 or relative to the time when $T_0$ counter expires, or relative to the end of frame. $T_1$ is measured in units of cycles of the symbol clock 424. When the lock signal 442 is high (i.e., active), $T_1$ is set to, at most, the idle time prior to the arrival of the next frame. A diagram of typical timing for the $T_1$ counter when demod signal 436 is making transitions is shown in FIG. 21. A typical timing for the $T_1$ counter when Demod is not making transitions and Lock is at '0' is shown in FIG. 22.

At S1922, a determination is made whether the time T since the beginning of the clock recovery period is less than or equal to $T_0$ and whether the negative edge of the demod signal 436 is not detected. If T is greater than $T_0$ or the negative edge of the demod signal 436 has been detected, or if both of these conditions are true (No), clock recovery is disabled and $T_0$ is reset (S1924). Then after a period equal to $T_1$ (S1926), the process is repeated beginning at S1902. On the other hand, if T is less than or equal to $T_0$ and the negative edge of the demod signal 436 has not been detected (i.e., the logical inverse of the (No) condition discussed above) (Yes), a determination is made whether frame start signal 440 is equal to 1, i.e., is active (S1920). If frame start signal 440 is not active (No), S1922 is repeated. On the other hand, if frame start signal 440 is active (Yes), clock recovery is disabled and $T_0$ is reset (S1928). Then it is determined if end of frame is reached (S1930). If end of frame is not reached (No), S1930 is repeated. If end of frame is reached (Yes), then after a period equal to $T_1$ (S1926), the process is repeated beginning at S1902.

According to embodiments of the present invention, S1904 and S1910 in the state diagram shown in FIG. 19 may be implemented by the pseudo-code shown below in Example Listing A.

Figure 23:
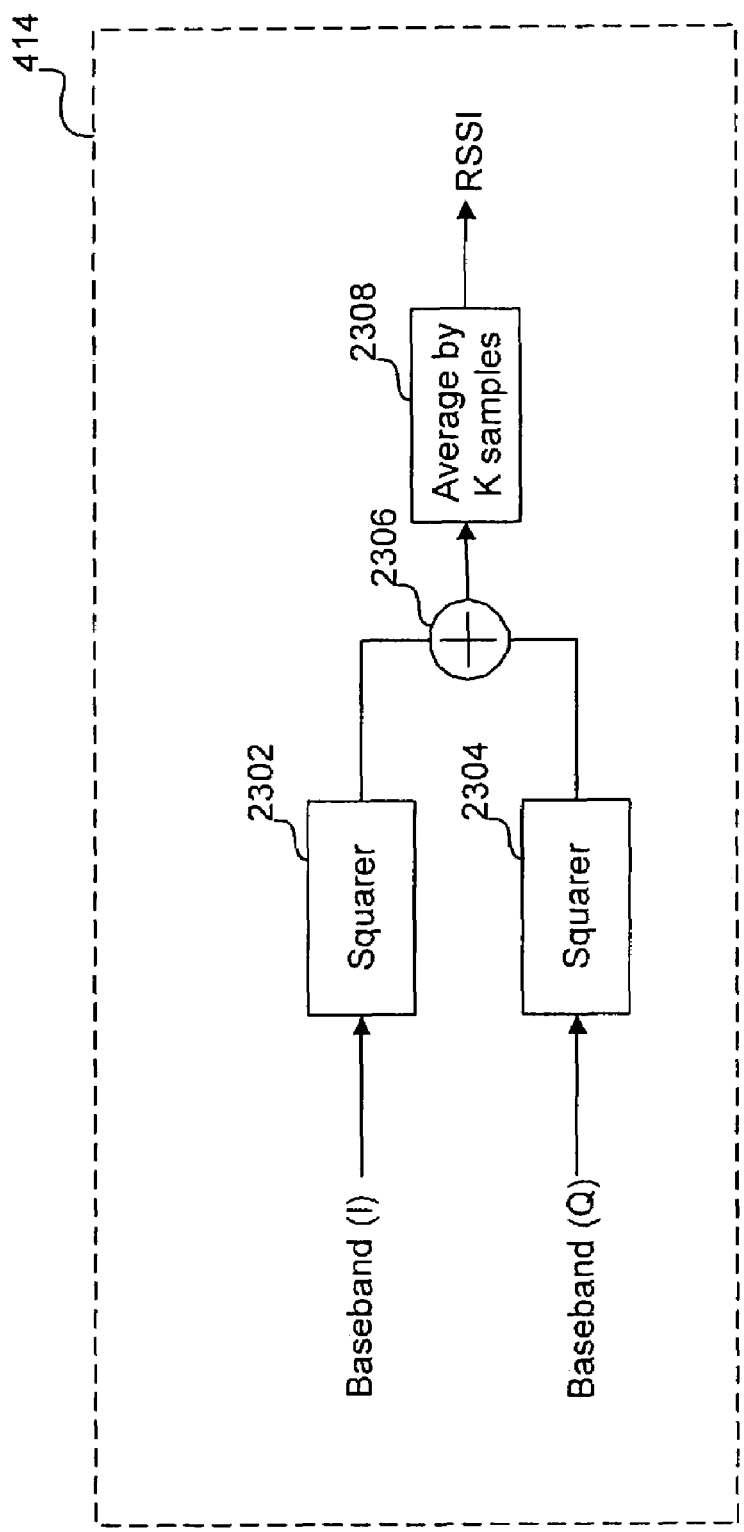
FIG. 23 shows a block diagram of an received signal strength indicator (RSSI) section, according to embodiments of the present invention.

FIG. 23 shows a block diagram of one embodiment of the RSSI section 414 shown in FIG. 4. RSSI section 414 comprises two squaring blocks 2302, 2304 that square the I and Q baseband inputs from the outputs of the ADCs 418, 420. The squared outputs are added at adder 2306 to form the RSSI for each cycle of the system clock 422. To provide a more accurate and stable estimate of the RSSI, these values are averaged over K samples at averaging block 2308. According to preferred embodiments of the present invention, K ranges from one to 64. The averaged RSSI values are then used by the AGC section 412 and the antenna select section 406.

Figure 24:
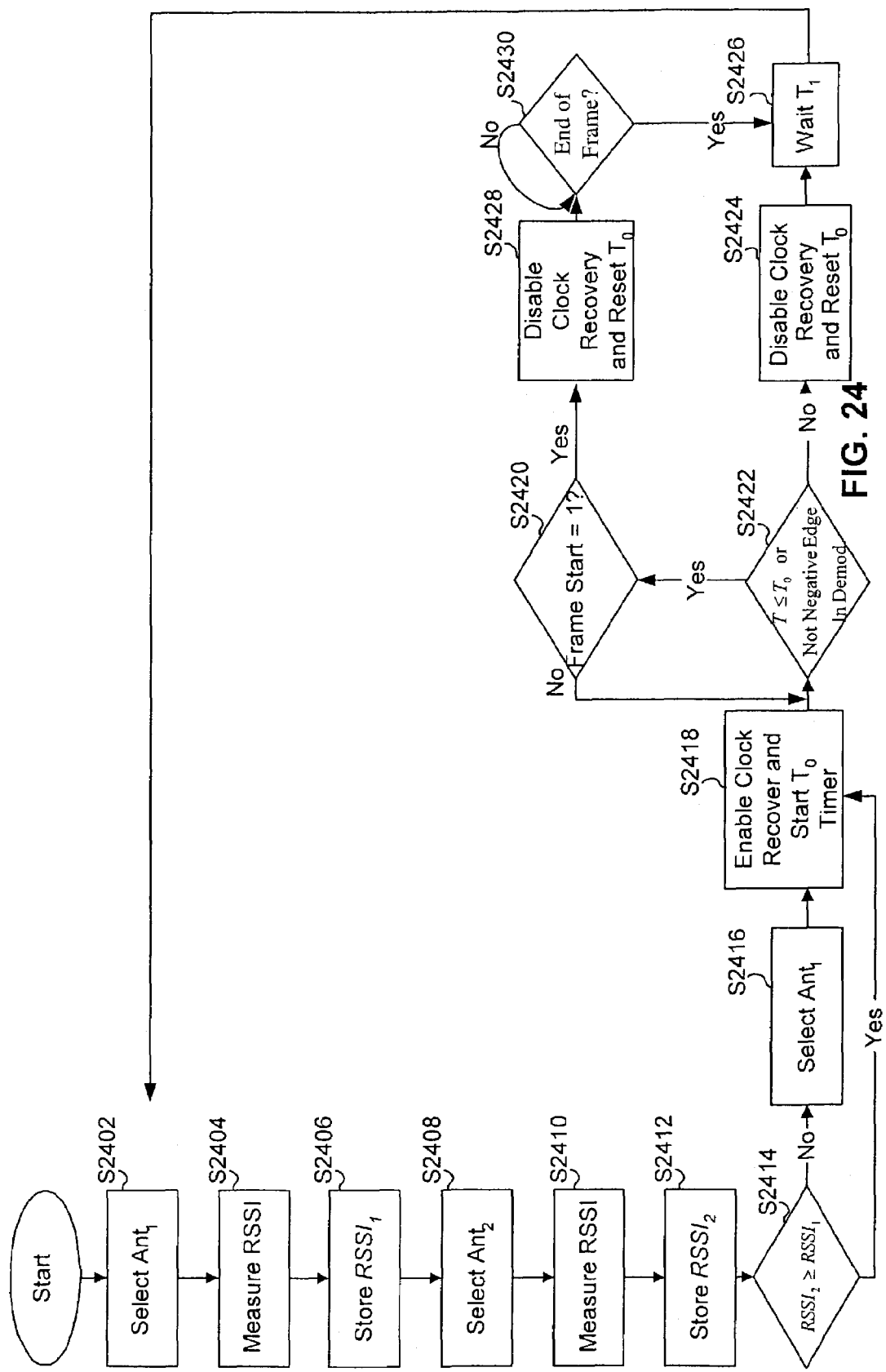
FIG. 24 shows a modification of the state diagram shown from FIG. 19, where only the RSSI is measured and compared to select between antennas, according to embodiments of the present invention.

In an embodiment of the present invention that does not employ AGC, the state diagram shown in FIG. 19 is modified to the one shown in FIG. 24, where only the RSSI is measured and compared to select between Ant1 and Ant2.

As shown in FIG. 24, initially the first antenna ($Ant_1$) is selected (S2402). Then, RSSI is measured (S2404). The RSSI when the first antenna is selected ($RSSI_1$) is then stored (S2406). Next, the second antenna ($Ant_2$) is selected (2408). Then, RSSI is again measured (S2410). The RSSI when the second antenna is selected ($RSSI_2$) is then stored (S2412). Next, it is determined whether $RSSI_2$ is greater than or equal to $RSSI_1$ (S2414). If $RSSI_2$ is not greater than or equal to $RSSI_1$ (No), $Ant_1$ is selected (S2416) and S2418 is performed. If $RSSI_2$ is greater than or equal to $RSSI_1$ (Yes), then $Ant_2$ remains selected and S2418 is performed. At S2418, the clock recovery section 428 is enabled and the $T_0$ timer is started.

At S2422, a determination is made whether the time T since the beginning of the clock recovery period is less than or equal to $T_0$ and whether the negative edge of the demod signal 436 is detected. If T is greater than $T_0$ or the negative edge of the demod signal 436 has been detected, or if both of these conditions are true (No), then the clock recovery section is disabled and $T_0$ is reset (S2424). After a period equal to $T_1$ (S2426), the process is repeated beginning at S2402. On the other hand, if T is less than or equal to $T_0$ and the negative edge of the demod signal 436 has not been detected (i.e., the logical inverse of the (No) condition discussed above) (Yes), a determination is made whether frame start signal 440 is equal to 1, i.e., is active (S2420). If frame start signal 440 is not active (No), S2422 is repeated. If frame start signal 440 is active (Yes), clock recovery is disabled and $T_0$ is reset (S2428). Then it is determined if end of frame is reached (S2430). If end of frame is not reached (No), S2430 is repeated. If end of frame is reached (Yes), then after a period equal to $T_1$ (S2426), the process is repeated beginning at S1902.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially matters of structure and management of parts within the principles of the present invention to the full extent indicated by the broad general meaning of the terms in which the appended claims are expressed.

The following Example Listing is a representative non-limiting example of embodiments of the present invention:

EXAMPLE LISTING A

```
Set the VGA (G_VGA) to MAX_VGA_GAIN
Set LNA gain (G_LNA) to MAX_LNA_GAIN
Obtain new RSSI value
if (RSSI < V_min) {
G_VGA = infinity;
} elseif (RSSI > V_max) {
    Set VGA gain to MIN_VGA_GAIN;
Obtain new RSSI value
If (RSSI > V_max) {
Set G_LNA to MIN_LNA_GAIN;
Obtain new RSSI value
If (RSSI > V_max) {G_VGA = –infinity} else {G_VGA = FindGain( )};
} else {
G_VGA = FindGain( );
        }
}
if G_VGA = infinity {
Total gain (G_t) = infinity;
} elseif (G_VGA = –infinity {
Total gain (G_t) = –infinity;
} else {
Total gain (G_t) = G_VGA + G_LNA;
}
```

The pseudo-code for the FindGain( ) function used above is shown below.

```
FindGain( ) {
     G_max(0) = MAX_VGA_GAIN;
     G_min(0) = MIN_VGA_GAIN;
G(0) = MIN_VGA_GAIN;
n = 1;
while ((V_max < RSSI | | RSSI < V_min) && Not TIMEOUT_AGC ) {
if (RSSI < V_min && G(n-1) MAX_VGA_GAIN && Not
TIMEOUT_AGC) {
     G_min(n) = G(n-1);
         G(n) = (G(n-1) + G_max(n-1)) / 2;
         If G(n) = = G(n-1) return (G(n) + 3N_zero);
              Obtain new RSSI value;
                   n = n + 1;
}
if (RSSI > V_max && G(n-1) MIN_VGA_GAIN && Not
TIMEOUT_AGC) {
     G_max(n) = G(n-1);
G(n) = (G(n-1) + Gmin(n-1)) / 2;
                             If G(n) = = G(n-1) return (G(n) +
                             3N_zero);
                        Obtain new RSSI value;
                             n = n + 1;
         }
}
if (V_max   RSSI   V_min) {
     return(G(n) + 3N_zero)
} elseif (TIMEOUT_AGC) {
         if (V_max   RSSI   V_min) {return(G(n) + 3N_zero)} else
         {return(nil));
     } else {
         invalid state;
issue error;
return(nil);
     }
}
```

Where:

$G_{VGA}$ denotes the gain of the variable gain amplifier (VGA) in the RF receiver.

MAX_VGA_GAIN denotes the maximum possible gain from the VGA.

MIN_VGA_GAIN denotes the minimum possible gain from the VGA.

$G_{LNA}$ denotes the gain of the low noise amplifier (LNA) in the RF receiver.

MAX_LNA_GAIN denotes the maximum possible gain from the LNA.

MIN_LNA_GAIN denotes the minimum possible gain from the LNA.

$G_t$ denotes the total gain in the RF receiver=$G_{VGA}$+$G_{LNA}$ (e.g. $G_1$, $G_2$ in S1906, S1912, S1914). This is used in the AGC algorithm to determine which antenna to select.

$V_{min}$ denotes the threshold for the minimum RSSI value needed by the search.

$V_{max}$ denotes the threshold for maximum RSSI value needed by the search.

Infinity denotes the gain equals or exceeds the maximum possible. This can be represented by a pre-defined binary code that is understood by the AGC algorithm.

–Infinity denotes the gain equals or exceeds the minimum possible. This can be represented by a pre-defined binary code that is understood by the AGC algorithm.

n denotes the nth iteration.

TIMEOUT$_{AGC}$ denotes the AGC timeout.

Note that $N_{zero}$ is the number of leading zeros in the RSSI. For example, an RSSI value of 0010011 has two leading zeros or $N_{zero}$=2.

What is claimed is:

1. A receiver for receiving a signal including digital data formed of packets transmitted from a transmitter, and for aligning a phase of a receiver clock with a phase of a transmitter clock, the receiver comprising:

a radio frequency (RF) receiver section for receiving the transmitted digital data as in-phase (I) and quadrature (Q) components of a baseband signal;

a sampling device for digitizing each of the in-phase (I) and quadrature (Q) components;

a clock recovery section configured to:

correlate the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and generate a second signal after the phase of the receiver clock is aligned with the phase of the transmitter clock, the second signal for controlling the sampling device such that the in-phase (I) and quadrature (Q) components are sampled at a symbol rate; and a multiplexer (MUX) having inputs for receiving a system clock signal and a symbol clock signal, an output electrically coupled to the sampling device, and a select line, the multiplexer (MUX) configured to multiplex a system clock signal and a symbol clock signal to the output of the multiplexer (MUX); wherein the sampling device comprises a pair of analog-to-digital converters (ADC), each for sampling one of the in-phase (I) and quadrature (Q) components, the pair of analog-to-digital converters adapted to be clocked by the output of the multiplexer (MUX), and wherein the second signal controls the sampling device by controlling the select line of the multiplexer (MUX) to select the symbol clock signal to be provided at the output of the multiplexer (MUX) such that the analog-to-digital converters (ADC) sample the in-phase (I) and quadrature (Q) components at the symbol rate.

2. A receiver for receiving a signal including digital data formed of packets transmitted from a transmitter, and for aligning a phase of a receiver clock with a phase of a transmitter clock, the receiver comprising:
a radio frequency (RF) receiver section for receiving the transmitted digital data as in-phase (I) and quadrature (Q) components of a baseband signal;
a sampling device for digitizing each of the in-phase (I) and quadrature (Q) components; and
a clock recovery section configured to:
correlate the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
generate a second signal after the phase of the receiver clock is aligned with the phase of the transmitter clock, the second signal for controlling the sampling device such that the in-phase (I) and quadrature (Q) components are sampled at a symbol rate;
wherein the clock recovery section comprises a correlation section for correlating the in-phase (I) and quadrature (Q) components with information contained in each of the packets by determining correlation peaks of the received signal based on the information contained in each of the packets; and
wherein the correlation section comprises:
a pair of matched filters for filtering the in-phase (I) and quadrature (Q) components to generate filtered outputs;
squarers for squaring the filtered outputs to generate squared outputs; and
an adder for adding the squared outputs to generate a correlation output;
wherein the clock recovery section further comprises:
an enable window section that determines if the correlation output is equal to or greater than a first threshold; and
a peak detector section enabled by the enable window section for searching for a correlation peak of the correlation output when the correlation output is equal to or greater than the first threshold; and
wherein enabling the peak detector section for searching for a correlation peak of the correlation output comprises enabling the peak detector section for:
subtracting two temporally adjacent correlation outputs to generate a difference signal; and
determining if the difference signal consists of a positive value immediately followed by a negative value.

3. The receiver recited in claim 2, wherein the clock recovery section further comprises a section for generating a third signal each time the difference signal consists of a positive value immediately followed by a negative value.

4. A receiver for receiving a signal including digital data formed of packets transmitted from a transmitter, and for aligning a phase of a receiver clock with a phase of a transmitter clock, the receiver comprising:
a radio frequency (RF) receiver section for receiving the transmitted digital data as in-phase (I) and quadrature (Q) components of a baseband signal;
a sampling device for digitizing each of the in-phase (I) and quadrature (Q) components;
a clock recovery section configured to:
correlate the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
generate a second signal after the phase of the receiver clock is aligned with the phase of the transmitter clock, the second signal for controlling the sampling device such that the in-phase (I) and quadrature (Q) components are sampled at a symbol rate; and
an over-sampling select line, wherein an enable window section generates a first time window having a first duration and a second time window having a second duration, the first and second time windows being selected by the over-sampling select line;
wherein the clock recovery section comprises a correlation section for correlating the in-phase (I) and quadrature (Q) components with information contained in each of the packets by determining correlation peaks of the received signal based on the information contained in each of the packets; and
wherein the correlation section comprises:
a pair of matched filters for filtering the in-phase (I) and quadrature (Q) components to generate filtered outputs;
squarers for squaring the filtered outputs to generate squared outputs; and
an adder for adding the squared outputs to generate a correlation output;
wherein the clock recovery section further comprises:
the enable window section which determines if the correlation output is equal to or greater than a first threshold; and
a peak detector section enabled by the enable window section for searching for a correlation peak of the correlation output when the correlation output is equal to or greater than the first threshold.

5. A receiver for receiving a signal including digital data formed of packets transmitted from a transmitter, and for aligning a phase of a receiver clock with a phase of a transmitter clock, the receiver comprising:
a radio frequency (RF) receiver section for receiving the transmitted digital data as in-phase (I) and quadrature (Q) components of a baseband signal;
a sampling device for digitizing each of the in-phase (I) and quadrature (Q) components; and
a clock recovery section configured to:
correlate the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
generate a second signal after the phase of the receiver clock is aligned with the phase of the transmitter clock, the second signal for controlling the sampling device such that the in-phase (I) and quadrature (Q) components are sampled at a symbol rate;
wherein the clock recovery section comprises a correlation section for correlating the in-phase (I) and quadrature (Q) components with information contained in each of the packets by determining correlation peaks of the received signal based on the information contained in each of the packets; and
wherein the correlation section comprises:
a pair of matched filters for filtering the in-phase (I) and quadrature (Q) components to generate filtered outputs;

squarers for squaring the filtered outputs to generate squared outputs; and an adder for adding the squared outputs to generate a correlation output;

wherein the clock recovery section further comprises:

an enable window section that determines if the correlation output is equal to or greater than a first threshold; and a peak detector section enabled by the enable window section for searching for a correlation peak of the correlation output when the correlation output is equal to or greater than the first threshold; and wherein the peak detector section comprises:

registers having an input for receiving the correlation output and outputs for outputting the two temporally adjacent correlation outputs; and a subtractor having inputs for receiving the two temporally adjacent correlation outputs from the registers and for subtracting the two temporally adjacent correlation outputs to generate a difference signal at an output of the subtractor.

6. The receiver recited in claim 5, wherein the peak detector section further comprises:

comparators for receiving the difference signal and for determining if the difference signal consists of a positive value immediately followed by a negative value; and a logic gate having inputs electrically coupled to outputs of the comparators and an output for generating a first trigger signal when the difference signal consists of a positive value immediately followed by a negative value.

7. The receiver recited in claim 6, wherein the clock recovery section further comprises a pulse generator for generating a third signal as a pulse in response to the first trigger signal.

8. The receiver recited in claim 7, wherein the clock recovery section further comprises a first signal generation section for:

receiving generated third signals;

determining a duration of a predetermined number of the generated third signals;

comparing the duration of the predetermined number of the generated third signals with a predetermined criteria; and generating the first signal if the duration of the predetermined number of the generated third signals meets the predetermined criteria.

9. The receiver recited in claim 8, wherein the receiver comprises a system clock, and wherein the first signal generation section comprises:

a first incrementer having a first value which is incremented once for each system clock cycle;

a second incrementer having a second value which is incremented once for each generated third signal;

a first comparator for receiving the second value as an input and for determining if the second value is greater than a first predetermined threshold;

a second comparator for determining if the first value is less than a second predetermined threshold when the second value is greater than the first predetermined threshold;

a third comparator for determining if the first value is greater than a third predetermined threshold when the second value is greater than the first predetermined threshold;

a first logic gate having inputs electrically coupled to outputs of the second and third comparators and an output for generating a second trigger signal when the first value is less than the second predetermined threshold and greater than the third predetermined threshold; and a pulse generator for generating the first signal as a pulse in response to the second trigger signal.

10. The receiver recited in claim 9, further comprising a second logic gate having a first input for receiving the second signal and a second input for receiving the third signal, and an output for generating a clock pulse when the second signal is not active and the third signal is active, the generated clock pulse for:

enabling the first incrementer to be incremented once for each system clock cycle; and incrementing the second incrementer once for each generated third signal.

11. The receiver recited in claim 10, wherein the information contained in each of the packets comprises a number of periods of a Barker sequence in a preamble of each of the packets, and wherein at a time when the second value becomes greater than the first predetermined threshold, a number of system clock cycles having occurred since enabling the first incrementer is equal to ((the predetermined threshold x the number of periods of the Barker sequence x an oversampling ratio)+a fixed delay).

12. A receiver for receiving a signal including digital data formed of packets transmitted from a transmitter, and for aligning a phase of a receiver clock with a phase of a transmitter clock, the receiver comprising:

a radio frequency (RF) receiver section for receiving the transmitted digital data as in-phase (I) and quadrature (Q) components of a baseband signal;

a sampling device for digitizing each of the in-phase (I) and quadrature (Q) components; and a clock recovery section for:

correlating the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and generating a second signal after the phase of the receiver clock is aligned with the phase of the transmitter clock, the second signal for controlling the sampling device such that the in-phase (I) and quadrature (Q) components are sampled at a symbol rate;

wherein each of the packets comprises a start of frame (SOF) field and wherein the receiver further comprises a frame synchronization section for:

detecting a start of frame for each of the packets based on the start of frame (SOF) field contained in each of the packets;

generating a frame start signal indicating the start of frame each time the start of frame (SOF) field is detected;

detecting an end of frame for each of the packets; and providing a frame end signal to the clock recovery section when the end of frame is detected, the frame end signal causing the clock recovery section to generate a recovery signal indicating that the transmitter clock has been recovered; and wherein the receiver further comprises a received signal strength indicator (RSSI) section and an automatic gain control (AGC) section, and wherein the automatic gain control (AGC) section is enabled by the recovery signal to perform automatic gain control (AGC) based on an indicated received signal strength determined by the received signal strength indicator (RSSI) section.

13. The receiver recited in claim 12, wherein the receiver further comprises:
a storage device;
a first antenna;
a second antenna; and
an antenna select section programmed for:
(a) selecting the first antenna;
(b) performing a first automatic gain control (AGC) to determine a first total receiver gain;
(c) storing the first total receiver gain in the storage device;
(d) selecting the second antenna;
(e) performing a second automatic gain control (AGC) to determine a second total receiver gain;
(f) storing the second total receiver gain in the storage device;
(g) determining if the second total receiver gain is equal to or greater than the first total receiver gain;
(h) reselecting the first antenna if it is determined in (g) that the first total receiver gain is not equal to or greater than the second total receiver gain; and
(i) enabling the clock recovery section to perform clock recovery and starting a first timer for tracking a predetermined time-out period for performing clock recovery.

14. The receiver recited in claim 13, wherein the antenna select section is further programmed for:
(j) determining if a time period since the clock recovery section was enabled is less than or equal to the predetermined time-out period for performing clock recovery;
(k) determining if a negative edge of the second signal is detected;
(l) disabling the clock recovery section and resetting the first timer if it is determined in (j) that the time period since the clock recovery section was enabled is greater than the predetermined time-out period, or if it is determined in (k) that the negative edge of the second signal is detected, or if it is determined in (j) and (k) both that the time period since the clock recovery section was enabled is greater than the predetermined time-out period and that the negative edge of the second signal is detected;
(m) waiting a predetermined time period; and
(n) after waiting the predetermined time period, repeating (a)-(l).

15. The receiver recited in claim 14, wherein the antenna select section is further programmed for:
(o) determining if the frame start signal is active if it is determined in (j) that the time period since the clock recovery section was enabled is less than or equal to the predetermined time-out period and if it is determined in (k) that the negative edge of the second signal is not detected;
(p) repeating (j)-(k) if it is determined in (o) that the frame start signal is not active;
(q) disabling the clock recovery section and resetting the first timer if it is determined in (o) that the frame start signal is active;
(r) determining if an end of frame has been reached;
(s) repeating (r) if it is determined in (r) that an end of frame has not been reached;
(t) waiting a predetermined time period; and
(u) after waiting the predetermined time period, repeating (a)-(q) if it is determined in (r) that an end of frame has been reached.

16. The receiver recited in claim 13, wherein the receiver further comprises a variable gain amplifier (VGA) and a low noise amplifier (LNA), and wherein performing an automatic gain control (AGC) to determine a total receiver gain comprises:
setting a gain of the variable gain amplifier (VGA) to a maximum possible gain;
setting a gain of the low noise amplifier (LNA) to a maximum possible gain;
obtaining a first received signal strength indicator (RSSI) value;
determining if the first received signal strength indicator (RSSI) value is less than a first threshold; and
setting the gain of the variable gain amplifier (VGA) to infinity if it is determined that the first received signal strength indicator (RSSI) value is less than the first threshold.

17. The receiver recited in claim 16, wherein performing the automatic gain control (AGC) to determine the total receiver gain further comprises:
determining if the first received signal strength indicator (RSSI) value is greater than a second threshold;
setting the gain of the variable gain amplifier (VGA) to a minimum possible gain if it is determined that the first received signal strength indicator (RSSI) value is greater than the second threshold;
obtaining a second received signal strength indicator (RSSI) value;
determining if the second received signal strength indicator (RSSI) value is greater than the second threshold; and
setting the gain of the low noise amplifier (LNA) to a minimum possible gain if it is determined that the second received signal strength indicator (RSSI) value is greater than the second threshold.

18. The receiver recited in claim 17, wherein performing the automatic gain control (AGC) to determine the total receiver gain further comprises:
obtaining a third received signal strength indicator (RSSI) value;
determining if the third received signal strength indicator (RSSI) value is greater than the second threshold; and
setting the gain of the variable gain amplifier (VGA) to negative infinity if it is determined that the third received signal strength indicator (RSSI) value is greater than the second threshold.

19. The receiver recited in claim 18, wherein if it is determined that the third received signal strength indicator (RSSI) value is greater than the second threshold and the third received signal strength indicator (RSSI) value is greater than the second threshold, performing the automatic gain control (AGC) to determine the total receiver gain further comprises searching for a variable gain amplifier (VGA) gain value among all available variable gain amplifier (VGA) gain values until a predetermined condition is met.

20. The receiver recited in claim 19, wherein if it is determined that the first received signal strength indicator (RSSI) value is not less than the first threshold and is not greater than the second threshold, performing the automatic gain control (AGC) to determine the total receiver gain further comprises searching for a variable gain amplifier (VGA) gain value among all available variable gain amplifier (VGA) gain values until a predetermined condition is met.

21. The receiver recited in claim 19, wherein the predetermined condition is at least one of a first condition wherein a latest received signal strength indicator (RSSI) value is both greater than or equal to the first threshold and less than or equal to the second threshold and a second condition wherein a time period for performing automatic gain control (AGC) has been exceeded.

22. The receiver recited in claim 20, wherein the predetermined condition is at least one of a first condition wherein a latest received signal strength indicator (RSSI) value is both greater than or equal to the first threshold and less than or equal to the second threshold and a second condition wherein a time period for performing automatic gain control (AGC) has been exceeded.

23. The receiver recited in claim 19, wherein searching for a variable gain amplifier (VGA) gain value among all available variable gain amplifier (VGA) gain values is performed using a search algorithm.

24. The receiver recited in claim 23, wherein the search algorithm is a binary search algorithm.

25. The receiver recited in claim 20, wherein searching for a variable gain amplifier (VGA) gain value among all available variable gain amplifier (VGA) gain values is performed using a search algorithm.

26. The receiver recited in claim 25, wherein the search algorithm is a binary search algorithm.

27. The receiver recited in claim 16, wherein when the gain of the variable gain amplifier (VGA) is set to infinity, the total receiver gain is set to infinity.

28. The receiver recited in claim 27, wherein when the gain of the variable gain amplifier (VGA) is set to negative infinity, the total receiver gain is set to-infinity.

29. The receiver recited in claim 19, wherein the total receiver gain is equal to (the gain of the variable gain amplifier (VGA) +the gain of the gain of the low noise amplifier (LNA).

30. The receiver recited in claim 20, wherein the total receiver gain is equal to (the gain of the variable gain amplifier (VGA) +the gain of the gain of the low noise amplifier (LNA).

31. The receiver recited in claim 13, wherein the received signal strength indicator (RSSI) section comprises:
   squarers having inputs electrically coupled to outputs of the sampling device, the squarers for squaring outputs of the sampling device to generate squared outputs at an output of the squarers; and
   an adder having inputs for receiving the generated squared outputs, the adder for adding the squared outputs for providing added squared outputs at an output of the adder.

32. A receiver for receiving a signal including digital data formed of packets transmitted from a transmitter, and for aligning a phase of a receiver clock with a phase of a transmitter clock, the receiver comprising:
   a radio frequency (RF) receiver section for receiving the transmitted digital data as in-phase (I) and quadrature (Q) components of a baseband signal;
   a sampling device for digitizing each of the in-phase (I) and quadrature (Q) components; and
   a clock recovery section for:
      correlating the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
      generating a second signal after the phase of the receiver clock is aligned with the phase of the transmitter clock, the second signal for controlling the sampling device such that the in-phase (I) and quadrature (Q) components are sampled at a symbol rate;
   wherein each of the packets comprises a start of frame (SOF) field and wherein the receiver further comprises a frame synchronization section for:
      detecting a start of frame for each of the packets based on the start of frame (SOF) field contained in each of the packets;
      generating a frame start signal indicating the start of frame each time the start of frame (SOF) field is detected;
      detecting an end of frame for each of the packets; and
      providing a frame end signal to the clock recovery section when the end of frame is detected, the frame end signal causing the clock recovery section to generate a recovery signal indicating that the transmitter clock has been recovered;
   wherein the receiver further comprises, a received signal strength indicator (RSSI) section for determining a received signal strength, a first antenna; a second antenna; and an antenna select section programmed for:
      (a) selecting the first antenna;
      (b) measuring a first received signal strength;
      (c) storing the first received signal strength in a storage device;
      (d) selecting the second antenna;
      (e) measuring a second received signal strength;
      (f) storing the second received signal strength in the storage device;
      (g) determining if the second received signal strength is equal to or greater than the first received signal strength;
      (h) reselecting the first antenna if it is determined in (g) that the second received signal strength is not equal to or greater than the first received signal strength;
      (i) enabling the clock recovery section to perform clock recovery;
      (j) determining if a time period since the clock recovery section was enabled is less than or equal to the predetermined time-out period for performing clock recovery;
      (k) determining if a negative edge of the second signal is detected;
      (l) disabling the clock recovery section and resetting a first timer if it is determined in (j) that the time period since the clock recovery section was enabled is greater than the predetermined time-out period, or if it is determined in (k) that the negative edge of the second signal is detected, or if it is determined in (j) and (k) both that the time period since the clock recovery section was enabled is greater than the predetermined time-out period and that the negative edge of the second signal is detected;
      (m) waiting a predetermined time period; and
      (n) after waiting the predetermined time period, repeating (a)-(l).

33. The receiver recited in claim 32, wherein the antenna select section is further programmed for:
   (o) determining if the frame start signal is active if it is determined in (j) that the time period since the clock recovery section was enabled is less than or equal to the predetermined time-out period and if it is determined in (k) that the negative edge of the second signal is not detected;
   (p) repeating (j)-(k) if it is determined in (o) that the frame start signal is not active;
   (q) disabling the clock recovery section and resetting the first timer if it is determined in (o) that the frame start signal is active;

(r) determining if an end of frame has been reached;
(s) repeating (r) if it is determined in (r) that an end of frame has not been reached;
(t) waiting a predetermined time period; and
(u) after waiting the predetermined time period, repeating (a)-(q) if it is determined in (r) that an end of frame has been reached.

34. The receiver recited in claim 32, wherein the received signal strength indicator (RSSI) section comprises:
squarers having inputs electrically coupled to outputs of the sampling device, the squarers for squaring outputs of the sampling device to generate squared outputs at an output of the squarers; and
an adder having inputs for receiving the generated squared outputs, the adder for adding the squared outputs for providing added squared outputs at an output of the adder.

35. The receiver recited in claim 34, wherein the received signal strength indicator (RSSI) section further comprises an averaging block for receiving the added squared outputs and for averaging over a predetermined number of samples of the added squared outputs.

36. The receiver recited in claim 35, wherein the predetermined number of samples ranges from one to 64.

37. A receiver for receiving a signal including digital data formed of packets transmitted from a transmitter, and for aligning a phase of a receiver clock with a phase of a transmitter clock, the receiver comprising:
a radio frequency (RF) receiver section for receiving the transmitted digital data as in-phase (I) and quadrature (Q) components of a baseband signal;
a sampling device for digitizing each of the in-phase (I) and quadrature (Q) components;
a clock recovery section for:
correlating the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
generating a second signal after the phase of the receiver clock is aligned with the phase of the transmitter clock, the second signal for controlling the sampling device such that the in-phase (I) and quadrature (Q) components are sampled at a symbol rate; and
a non-coherent demodulator having inputs electrically coupled to outputs of the sampling device, the demodulator for recovering transmitted symbols and for providing the recovered transmitted symbols at an output of the demodulator;
wherein the demodulator comprises differential detectors for multiplying the in-phase (I) and quadrature (Q) components of the baseband signal by a delayed version of the in-phase (I) and quadrature (Q) components of the baseband signal; and
wherein the non-coherent demodulator further comprises:
an adder having inputs for receiving outputs of the differential detectors, the adder for adding the received outputs of the differential detectors and for generating a soft decision value at an output of the adder; and
a slicer having an input for receiving the soft decision value and for generating a demodulated symbol based on the soft decision value at an output of the slicer.

38. A receiver for receiving a signal including digital data formed of packets transmitted from a transmitter, and for aligning a phase of a receiver clock with a phase of a transmitter clock, the receiver comprising:
a radio frequency (RF) receiver section for receiving the transmitted digital data as in-phase (I) and quadrature (Q) components of a baseband signal;
a sampling device for digitizing each of the in-phase (I) and quadrature (Q) components;
a clock recovery section for:
correlating the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
generating a second signal after the phase of the receiver clock is aligned with the phase of the transmitter clock, the second signal for controlling the sampling device such that the in-phase (I) and quadrature (Q) components are sampled at a symbol rate; and
a timing generator section for receiving as an input an over-sampled clock signal having a first rate greater than the symbol rate and for generating at an output of the timing generator section, in response to the first signal, a clock signal having the symbol rate;
wherein the receiver further comprises an over-sampling select line; and wherein the timing generator section comprises:
a first dividing circuit for dividing the over-sampled clock signal by a first number, when the first signal is active, to generate a first symbol clock signal having a first symbol rate;
a second dividing circuit for dividing the over-sampled clock signal by a second number, when the first signal is active, to generate a second symbol clock signal having a second symbol rate; and
a multiplexer for multiplexing the first symbol clock signal and the second symbol clock signal based on a state of the over-sampling select line.

39. The receiver recited in claim 38, wherein each of the packets comprises a preamble, and wherein the in-phase (I) and quadrature (Q) components are correlated with information contained in the preamble of each of the packets.

40. The receiver recited in claim 39, wherein the preamble comprises a plurality of periods of a synchronization code, and wherein the correlation section correlates the in-phase (I) and quadrature (Q) components with at least one period of the synchronization code.

41. The receiver recited in claim 40, wherein the synchronization code is an 11-bit Barker sequence.

42. The receiver recited in claim 41, wherein a first portion of the synchronization code is not differentially encoded and a second portion of the synchronization code is differentially encoded.

43. The receiver recited in claim 42, wherein the synchronization code is at least one of a Barker code, a pseudo noise code, a Kasami sequence and a Gold sequence.

44. A method for receiving at a receiver a signal transmitted from a transmitter, the signal including digital data formed of packets, and for aligning a phase of a receiver clock with a phase of a transmitter clock, the method comprising:
receiving the transmitted digital data as in-phase (I) and quadrature (Q) components of a baseband signal;
digitizing the in-phase (I) and quadrature (Q) components;
correlating the in-phase (I) and quadrature (Q) components with information contained in each of the packets;

generating a first signal to align the phase of the receiver clock with the phase of the transmitter clock based on the correlation of the in-phase (I) and quadrature (Q) components with the information contained in each of the packets; and generating a second signal upon alignment of the phase of the receiver clock with the phase of the transmitter clock, the second signal for selecting a clock for sampling the in-phase (I) and quadrature (Q) components at a symbol rate;

wherein generating a first signal to align the phase of the receiver clock with the phase of the transmitter clock further comprises:

generating a third signal for each of a plurality of correlation peaks of the received signal determined based on the information contained in each of the packets;

determining a duration of a predetermined number of the generated third signals;

comparing the duration of the predetermined number of the generated third signals with a predetermined criteria; and generating the first signal if the duration of the predetermined number of the generated third signals meets the predetermined criteria.

45. The method recited in claim 44, wherein the preamble comprises a plurality of periods of a synchronization code, and wherein correlating the in-phase (I) and quadrature (Q) components with the information contained in the preamble comprises correlating the in-phase (I) and quadrature. (Q) components with at least one period of the synchronization code.

46. The method recited in claim 45, wherein the synchronization code is an 11-bit Barker sequence.

47. The method recited in claim 45, wherein the synchronization code is at least one of a Barker code, a pseudo noise code, a Kasami sequence and a Gold sequence.

48. The method recited in claim 45, wherein each of the packets further comprises a start of frame (SOF) field and a plurality of data blocks, and wherein the start of frame (SOF) field is differentially encoded.

49. The method recited in claim 48, wherein each of the packets comprises a start of frame (SOF) field, and wherein the method further comprises:

detecting a start of frame for each of the packets based on the start of frame (SOF) field contained in each of the packets;

generating a frame start signal indicating the start of frame each time the start of frame (SOF) field is detected; and generating a recovery signal after the frame start is generated, the recovery signal indicating that the transmitter clock has been recovered.

50. The method of claim 44, further comprising:

filtering the in-phase (I) and quadrature (Q) components with corresponding matched filters to generate corresponding filtered outputs of the corresponding matched filters.

51. The method of claim 50, wherein the corresponding matched filters are finite impulse response (FIR) filters having coefficients equal to a time reverse of the information contained in each of the packets.

52. The method of claim 50, wherein the corresponding matched filters are finite impulse response (FIR) filters; and wherein the information contained in each of the packets comprises a synchronization code in a preamble of each of the packets, and wherein the finite impulse response (FIR) filters have coefficients equal to a time reverse of the synchronization code.

53. A method for receiving at a receiver a signal transmitted from a transmitter, the signal including digital data in the form of packets, and for aligning a phase of a receiver clock with a phase of a transmitter clock, the method comprising:

receiving the transmitted digital data as in-phase (I) and quadrature (Q) components of a baseband signal;

digitizing the in-phase (I) and quadrature (Q) components;

correlating the in-phase (I) and quadrature (Q) components with information contained in each of the packets;

generating a first signal to align the phase of the receiver clock with the phase of the transmitter clock based on the correlation of the in-phase (I) and quadrature (Q) components with the information contained in each of the packets;

generating a second signal upon alignment of the phase of the receiver clock with the phase of the transmitter clock, the second signal for selecting a clock for sampling the in-phase (I) and quadrature (Q) components at a symbol rate, wherein each of the packets comprises a preamble, and wherein the in-phase (I) and quadrature (Q) components are correlated with information contained in the preamble of each of the packets;

wherein the preamble comprises a plurality of periods of a synchronization code;

wherein correlating the in-phase (I) and quadrature (Q) components with the information contained in the preamble comprises correlating the in-phase (I) and quadrature (Q) components with at least one period of the synchronization code; and wherein a first portion of the synchronization code is not differentially encoded and a second portion of the synchronization code is differentially encoded.

54. A method for receiving at a receiver a signal transmitted from a transmitter, the signal including digital data in the form of packets, and for aligning a phase of a receiver clock with a phase of a transmitter clock, the method comprising:

receiving the transmitted digital data as in-phase (I) and quadrature (Q) components of a baseband signal;

digitizing the in-phase (I) and quadrature (Q) components;

correlating the in-phase (I) and quadrature (Q) components with information contained in each of the packets;

generating a first signal to align the phase of the receiver clock with the phase of the transmitter clock based on the correlation of the in-phase (I) and quadrature (Q) components with the information contained in each of the packets; and generating a second signal upon alignment of the phase of the receiver clock with the phase of the transmitter clock, the second signal for selecting a clock for sampling the in-phase (I) and quadrature (Q) components at a symbol rate;

wherein each of the packets comprises a preamble, and wherein the in-phase (I) and quadrature (Q) components are correlated with information contained in the preamble of each of the packets; and wherein each of the packets further comprises a start of frame (SOF) field, a plurality of data blocks and a header, and wherein the preamble and the start of frame (SOF) field are modulated according to a first modulation scheme and the data blocks and the header are modulated according to a second modulation scheme.

55. The method recited in claim 54, wherein correlating the in-phase (I) and quadrature (Q) components with information contained in each of the packets comprises:

filtering the in-phase (I) and quadrature (Q) components with corresponding matched filters to generate corresponding filtered outputs of the corresponding matched filters;

squaring the corresponding filtered outputs to generate corresponding squared outputs; and adding the corresponding squared outputs to generate a correlation output.

56. The method recited in claim 55, further comprising:

determining if the correlation output is equal to or greater than a first threshold; and searching for a correlation peak of the correlation output when the correlation output is equal to or greater than the first threshold.

57. The method recited in claim 55, wherein the corresponding matched filters are finite impulse response (FIR) filters.

58. A method for receiving at a receiver a signal transmitted from a transmitter, the signal including digital data in the form of packets, and for aligning a phase of a receiver clock with a phase of a transmitter clock, the method comprising:

receiving the transmitted digital data as in-phase (I) and quadrature (Q) components of a baseband signal;

digitizing the in-phase (I) and quadrature (Q) components;

correlating the in-phase (I) and quadrature (Q) components with information contained in each of the packets by a process that includes:

filtering the in-phase (I) and quadrature (Q) components with corresponding matched filters to generate corresponding filtered outputs of the corresponding matched filters;

squaring the corresponding filtered outputs to generate corresponding squared outputs; and adding the corresponding squared outputs to generate a correlation output;

generating a first signal to align the phase of the receiver clock with the phase of the transmitter clock based on the correlation of the in-phase (I) and quadrature (Q) components with the information contained in each of the packets;

generating a second signal upon alignment of the phase of the receiver clock with the phase of the transmitter clock, the second signal for selecting a clock for sampling the in-phase (I) and quadrature (Q) components at a symbol rate;

determining if the correlation output is equal to or greater than a first threshold; and searching for a correlation peak of the correlation output when the correlation output is equal to or greater than the first threshold;

wherein the receiver comprises a first counter and a second counter and wherein searching for a correlation peak of the correlation output comprises:

subtracting two temporally adjacent correlation outputs to generate a difference signal;

determining if the difference signal consists of a positive value immediately followed by a negative value;

generating a third signal each time the difference signal consists of a positive value immediately followed by a negative value;

incrementing a first counter value of the first counter each time the third signal is generated;

incrementing a second counter value of the second counter for each cycle of a system clock; and enabling the first signal to be generated when the first counter value is equal to a predetermined number.

59. The method recited in claim 58, wherein the first signal is generated based on the second counter value.

60. The method recited in claim 59, wherein the first signal is generated when the second counter value is less than a second threshold and greater than a third threshold.

61. A method for receiving at a receiver a signal transmitted from a transmitter, the signal including digital data in the form of packets, and for aligning a phase of a receiver clock with a phase of a transmitter clock, the method comprising:

receiving the transmitted digital data as in-phase (I) and quadrature (Q) components of a baseband signal;

digitizing the in-phase (I) and quadrature (Q) components;

correlating the in-phase (I) and quadrature (Q) components with information contained in each of the packets;

generating a first signal to align the phase of the receiver clock with the phase of the transmitter clock based on the correlation of the in-phase (I) and quadrature (Q) components with the information contained in each of the packets; and generating a second signal upon alignment of the phase of the receiver clock with the phase of the transmitter clock, the second signal for selecting a clock for sampling the in-phase (I) and quadrature (Q) components at a symbol rate;

wherein each of the packets comprises a preamble, and wherein the in-phase (I) and quadrature (Q) components are correlated with information contained in the preamble of each of the packets;

wherein the preamble comprises a plurality of periods of a synchronization code, and wherein correlating the in-phase (I) and quadrature (Q) components with the information contained in the preamble comprises correlating the in-phase (I) and quadrature, (Q) components with at least one period of the synchronization code;

wherein each of the packets further comprises a start of frame (SOF) field and a plurality of data blocks, and wherein the start of frame (SOF) field is differentially encoded;

wherein the method further comprise:

detecting a start of frame for each of the packets based on the start of frame (SOF) field contained in each of the packets;

generating a frame start signal indicating the start of frame each time the start of frame (SOF) field is detected; and generating a recovery signal after the frame start is generated, the recovery signal indicating that the transmitter clock has been recovered; and wherein an automatic gain control (AGC) loop of the receiver is enabled based on the recovery signal.

62. The method recited in claim 61, wherein the receiver comprises a first timer for tracking a predetermined time-out period for performing clock recovery, and a second timer for tracking a predetermined time period to wait after enabling the automatic gain control (AGC) loop before again enabling the automatic gain control (AGC) loop; and wherein a duration of the first timer and a duration of the second timer are adjusted relative to the clock recovery signal.

63. A method for receiving at a receiver a signal transmitted from a transmitter, the signal including digital data in the form of packets, and for aligning a phase of a receiver clock with a phase of a transmitter clock, the method comprising:

receiving the transmitted digital data as in-phase (I) and quadrature (Q) components of a baseband signal;

digitizing the in-phase (I) and quadrature (Q) components;
correlating the in-phase (I) and quadrature (Q) components with information contained in each of the packets;
generating a first signal to align the phase of the receiver clock with the phase of the transmitter clock based on the correlation of the in-phase (I) and quadrature (Q) components with the information contained in each of the packets;
generating a second signal upon alignment of the phase of the receiver clock with the phase of the transmitter clock, the second signal for selecting a clock for sampling the in-phase (I) and quadrature (Q) components at a symbol rate;
wherein each of the packets comprises a preamble, and wherein the in-phase (I) and quadrature (Q) components are correlated with information contained in the preamble of each of the packets;
wherein the preamble comprises a plurality of periods of a synchronization code, and wherein correlating the in-phase (I) and quadrature (Q) components with the information contained in the preamble comprises correlating the in-phase (I) and quadrature, components with at least one period of the synchronization code;
wherein each of the packets further comprises a start of frame (SOF) field and a plurality of data blocks, and wherein the start of frame (SOF) field is differentially encoded;
detecting a start of frame for each of the packets based on the start of frame (SOF) field contained in each of the packets;
generating a frame start signal indicating the start of frame each time the start of frame (SOF) field is detected;
generating a recovery signal after the frame start is generated, the recovery signal indicating that the transmitter clock has been recovered;
determining if a predetermined number of consecutive frame start signals have not been detected; and
resetting the recovery signal if the predetermined number of consecutive frame start signals have not been detected.

64. The method recited in claim 63, further comprising:
determining if the second signal is active;
determining if a portion of a period of the synchronization code is detected when it is determined that the second signal is active;
determining if the start of frame (SOF) field is detected when the portion of the synchronization code is detected; and
generating the frame start signal when the start of frame (SOF) field is detected.

65. The method recited in claim 64, further comprising:
detecting an end of frame for each of the packets; and
generating a frame end signal when the end of frame is detected; and
resetting the second signal after the frame end signal is generated.

66. The method recited in claim 65, wherein the end of frame is detected based on a count of a number of bits received after the frame start signal is generated.

67. The method recited in claim 65, wherein the frame end signal is generated immediately after the beginning of the last bit in each of the packets.

68. The method recited in claim 64, wherein the receiver comprises a counter and wherein the method further comprises:
determining if a complete period of the synchronization code is detected when the portion of the synchronization code is not detected;
incrementing the counter when a complete period of the synchronization code is not detected;
determining if a value of the counter is greater than a predetermined threshold; and
resetting the second signal if the value of the counter is greater than the predetermined threshold.

69. The method recited in claim 64, wherein the receiver comprises a counter and wherein the method further comprises:
determining if a complete period of the synchronization code is detected when the start of frame (SOF) field is not detected;
incrementing the counter when a complete period of the synchronization code is not detected;
determining if a value of the counter is greater than a predetermined threshold value; and
resetting the second signal if the value of the counter is greater than the predetermined threshold.

70. A receiver for receiving a signal including digital data formed of packets transmitted from a transmitter, and for aligning a phase of a receiver clock with a phase of a transmitter clock, the receiver comprising:
a radio frequency (RF) receiver section for receiving the transmitted digital data as in-phase (I) and quadrature (Q) components of a baseband signal;
a sampling device for digitizing each of the in-phase (I) and quadrature (Q) components; and
a clock recovery section comprising:
a correlation section that correlates the in-phase (I) and quadrature (Q) components with information contained in each of the packets by determining correlation values of the received signal based on the information contained in each of the packets, and that generates a correlation output,
an enable window section that determines if the correlation output meets a first threshold, and
a detector section enabled by the enable window section to search for a correlation value of the correlation output when the correlation output meets the first threshold,
wherein the clock recovery section is configured to:
correlate the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
generate a second signal after the phase of the receiver clock is aligned with the phase of the transmitter clock, the second signal for controlling the sampling device such that the in-phase (I) and quadrature (Q) components are sampled at a symbol rate; and
a multiplexer (MUX) having inputs for receiving a system clock signal and a symbol clock signal, an output electrically coupled to the sampling device, and a select line, the multiplexer (MUX) configured to multiplex a system clock signal and a symbol clock signal to the output of the multiplexer (MUX);
wherein, in searching for the correlation value, the detector section:

detects two temporally adjacent correlation outputs to generate a difference signal; and determines if the difference signal consists of a positive value immediately following a negative value.

71. The receiver of claim 70, wherein the correlation section further comprises a pair of matched filters for filtering in-phase (I) and quadrature (Q) components to generate filtered outputs.

72. The receiver of claim 71, wherein the pair of matched filters comprise a finite impulse response (FIR) filer.

73. The receiver recited in claim 72, wherein the finite impulse response (FIR) filter has coefficients equal to a time reverse of the information contained in each of the packets.

74. The receiver of claim 72, wherein the information contained in each of the packets comprises a synchronization code in a preamble of each of the packets, and wherein the finite impulse response (FIR) filter has coefficients equal to a time reverse of the synchronization code.

75. The receiver recited in claim 70, wherein:
the enable window section determines if the correlation output is equal to or greater than the first threshold; and
the detector section is enabled by the enable window section for searching for a correlation peak of the correlation output when the correlation output is equal to or greater than the first threshold.

76. The receiver of claim 70, wherein the receiver further comprises, a received signal strength indicator (RSSI) section for determining a received signal strength, a first antenna; a second antenna; and an antenna select section programmed for:
(a) selecting the first antenna;
(b) measuring a first received signal strength;
(c) storing the first received signal strength in a storage device;
(d) selecting the second antenna;
(e) measuring a second received signal strength;
(f) storing the second received signal strength in the storage device;
(g) determining if the second received signal strength is equal to or greater than the first received signal strength;
(h) reselecting the first antenna if it is determined in (g) that the second received signal strength is not equal to or greater than the first received signal strength; and
(i) enabling the clock recovery section to perform clock recovery.

77. The receiver of claim 70, wherein each of the packets comprises a start of frame (SOF) field and wherein the receiver further comprises a frame synchronization section for:
detecting a start of frame for each of the packets based on the start of frame (SOF) field contained in each of the packets;
generating a frame start signal indicating the start of frame each time the start of frame (SOF) field is detected;
detecting an end of frame for each of the packets; and
providing a frame end signal to the clock recovery section when the end of frame is detected, the frame end signal causing the clock recovery section to generate a recovery signal indicating that the transmitter clock has been recovered.

78. The receiver recited in claim 70, further comprising a demodulator having inputs electrically coupled to outputs of the sampling device, the demodulator for recovering transmitted symbols and for providing the recovered transmitted symbols at an output of the demodulator.

79. The receiver recited in claim 78, wherein the demodulator is a non-coherent demodulator.

80. The receiver recited in claim 79, wherein the non-coherent demodulator comprises differential detectors for multiplying the in-phase (I) and quadrature (Q) components of the baseband signal by a delayed version of the in-phase (I) and quadrature (Q) components of the baseband signal.

81. The receiver of claim 80, wherein the delayed version of the in-phase (I) and quadrature (Q) components of the baseband signal has a delay equal to a period of a symbol clock for clocking the sampling device at the symbol rate.

82. The receiver recited in claim 79, wherein the non-coherent demodulator demodulates differentially encoded binary phase shift key (BPSK) signals.

83. The receiver recited in claim 81, further comprising a timing generator section for receiving as an input an oversampled clock signal having a first rate greater than the symbol rate and for generating at an output of the timing generator section, in response to the first signal, a clock signal having the symbol rate.

84. The receiver recited in claim 83, wherein the first rate is four times greater than the symbol rate.

85. The receiver recited in claim 83, wherein the first rate is eight times greater than the symbol rate.

86. The receiver of claim 70, further comprising:
squarers for squaring the filtered outputs to generate squared outputs;
an adder for adding the squared outputs to generate the correlation output.

87. The receiver of claim 70, wherein the correlation section correlates the in-phase (I) and quadrature (Q) components by determining correlation peaks of the received signal.

88. The receiver of claim 70, further comprising:
wherein the enable window section includes an enable window means for determining if the correlation output is equal to or greater than a first threshold; and
wherein the detector section includes a peak detector means enabled by the enable window means for searching for a correlation peak of the correlation output when the correlation output is equal to or greater than the first threshold.

89. The receiver recited in claim 88, wherein the enable window means comprises:
means for subtracting two temporally adjacent correlation outputs to generate a difference signal; and
means for determining if the difference signal consists of a positive value immediately followed by a negative value.

90. The receiver recited in claim 89, further comprising means for generating a third signal each time the difference signal consists of a positive value immediately followed by a negative value.

91. The receiver recited in claim 88, wherein the enable window means comprises means for generating a first time window having a first duration and a second time window having a second duration.

92. The receiver recited in claim 90, further comprising:
means for receiving generated third signals;
means for determining a duration of a predetermined number of the generated third signals;
means for comparing the duration of the predetermined number of the generated third signals with a predetermined criteria; and
means for generating the first signal if the duration of the predetermined number of the generated third signals meets the predetermined criteria.

93. The receiver of claim 70, wherein each of the packets comprises a start of frame (SOF) field and wherein the receiver further comprises:
- a first detecting component that detects a start of frame for each of the packets based on the start of frame (SOF) field contained in each of the packets;
- a generating component that generates a frame start signal indicating the start of frame each time the start of frame (SOF) field is detected;
- a second detecting component that detects an end of frame for each of the packets; and
- a processing component that provides a frame end signal to the clock recovery section when the end of frame is detected, the frame end signal causing the clock recovery section to generate a recovery signal indicating that the transmitter clock has been recovered.

94. The receiver of claim 70, wherein each of the packets comprises a preamble, and wherein the in-phase (I) and quadrature (Q) components are correlated with information contained in the preamble of each of the packets.

95. A system for transmitting and receiving a signal including digital data in the form of packets and for aligning a phase of a receiver clock with a phase of a transmitter clock, the system comprising:
- a transmitter for transmitting the signal, the transmitter including the transmitter clock;
- a receiver for receiving the signal from the transmitter, the receiver including the receiver clock;
    - a radio frequency (RF) receiver section for receiving the transmitted digital data as in-phase (I) and quadrature (Q) components of a baseband signal;
    - a sampling device for digitizing each of the in-phase (I) and quadrature (Q) components; and
    - a clock recovery section comprising:
        - a correlation section that correlates the in-phase (I) and quadrature (Q) components with information contained in each of the packets by determining correlation values of the received signal based on the information contained in each of the packets, and that generates a correlation output,
        - an enable window section that determines if the correlation output meets a first threshold, and
        - a detector section enabled by the enable window section to search for a correlation value of the correlation output when the correlation output meets the first threshold,
    - wherein the clock recovery section is configured to:
        - correlate the in-phase (I) and quadrature (Q) components with information contained in each of the packets and for generating a first signal to align the phase of the receiver clock with the phase of the transmitter clock based on the correlation of the in-phase (I) and quadrature (Q) components with the information contained in each of the packets; and
        - generate a second signal after the phase of the receiver clock is aligned with the phase of the transmitter clock, the second signal for controlling the sampling device such that the in-phase (I) and quadrature (Q) components are sampled at a symbol rate; and
- a multiplexer (MUX) having inputs for receiving a system clock signal and a symbol clock signal, an output electrically coupled to the sampling device, and a select line, the multiplexer (MUX) configured to multiplex a system clock signal and a symbol clock signal to the output of the multiplexer (MUX);
- wherein, in searching for the correlation value, the detector section:
    - detects two temporally adjacent correlation outputs to generate a difference signal; and
    - determines if the difference signal consists of a positive value immediately following a negative value.

* * * * *